(12) United States Patent
Pajovic et al.

(10) Patent No.: US 11,122,397 B2
(45) Date of Patent: Sep. 14, 2021

(54) LOCALIZATION USING MILLIMETER WAVE BEAM ATTRIBUTES

(71) Applicant: Mitsubishi Electric Research Laboratories, Inc., Cambridge, MA (US)

(72) Inventors: Milutin Pajovic, Cambridge, MA (US); Toshiaki Koike-Akino, Belmont, MA (US); Pu Wang, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/689,431

(22) Filed: Nov. 20, 2019

(65) Prior Publication Data

US 2021/0152990 A1    May 20, 2021

(51) Int. Cl.

| | |
|---|---|
| *H04W 4/00* | (2018.01) |
| *H04W 4/33* | (2018.01) |
| *H04B 7/06* | (2006.01) |
| *H04B 7/0491* | (2017.01) |
| *H04B 7/0408* | (2017.01) |
| *H04W 24/08* | (2009.01) |
| *H04B 17/318* | (2015.01) |
| *H04B 17/336* | (2015.01) |
| *H04W 4/02* | (2018.01) |

(52) U.S. Cl.
CPC ............ *H04W 4/33* (2018.02); *H04B 7/0408* (2013.01); *H04B 7/0491* (2013.01); *H04B 7/0617* (2013.01); *H04B 7/0684* (2013.01); *H04B 17/318* (2015.01); *H04B 17/336* (2015.01); *H04W 4/026* (2013.01); *H04W 24/08* (2013.01)

(58) Field of Classification Search
CPC ... H04W 4/33; H04W 17/318; H04W 17/336; H04W 4/26; H04W 24/08; H04B 7/0408; H04B 7/0491; H04B 7/0617; H04B 7/0684

See application file for complete search history.

(56) References Cited

U.S. PATENT DOCUMENTS

| 2016/0021549 A1* | 1/2016 | Subramanian ........ H04W 76/10 370/329 |
| 2019/0097712 A1* | 3/2019 | Singh ...................... H04B 7/04 |

* cited by examiner

*Primary Examiner* — Minh Trang T Nguyen
(74) *Attorney, Agent, or Firm* — Gene Vinokur; Hironori Tsukamoto

(57) ABSTRACT

A communication system using beamforming transmission in a millimeter wave spectrum in an environment. A memory with data including values indicative of link attributes associated with beam signal measurements with states of devices and states of environments. The states of the devices for each device including types of user behavior, locations and poses in each environment. The states of the environments for each environment including, locations of physical objects and types of behavior of ambient users. Control circuitry performs beam training with a target device in environment to measure beam signal values and environmental responses for different beams transmitted over the different beam angles. Selects, in response to the beam training, at least one dominant angle for a beamforming communication with the target device. Estimates, one of a state of the target device or a state of the environment, corresponding to environmental responses for different beams estimated during the beam training.

16 Claims, 23 Drawing Sheets

| | 341 | | | 342 | | | 343 | |
|---|---|---|---|---|---|---|---|---|
| RSSI | AP1 sector | Client sector | RSSI | AP2 sector | Client sector | RSSI | AP3 sector | Client sector |
| -32 | 20 | 20 | -52 | 22 | 18 | -41 | 5 | 17 |
| -32 | 20 | 20 | -51 | 22 | 18 | -40 | 5 | 17 |
| -33 | 63 | 20 | -53 | 59 | 19 | -39 | 5 | 18 |
| -31 | 63 | 20 | -51 | 59 | 18 | -40 | 3 | 18 |
| -33 | 20 | 20 | -50 | 17 | 21 | -40 | 8 | 19 |
| -32 | 63 | 20 | -50 | 17 | 18 | -39 | 5 | 19 |
| -33 | 16 | 63 | -54 | 15 | 18 | -41 | 3 | 19 |

Location = 1, Orientation = 0°

FIG. 3D

Location = ?, Orientation = ?

| RSSI | AP sector | Client sector |
|---|---|---|
| -31 | 20 | 20 |
| -32 | 20 | 20 |
| -40 | 10 | 20 |

FIG. 6A

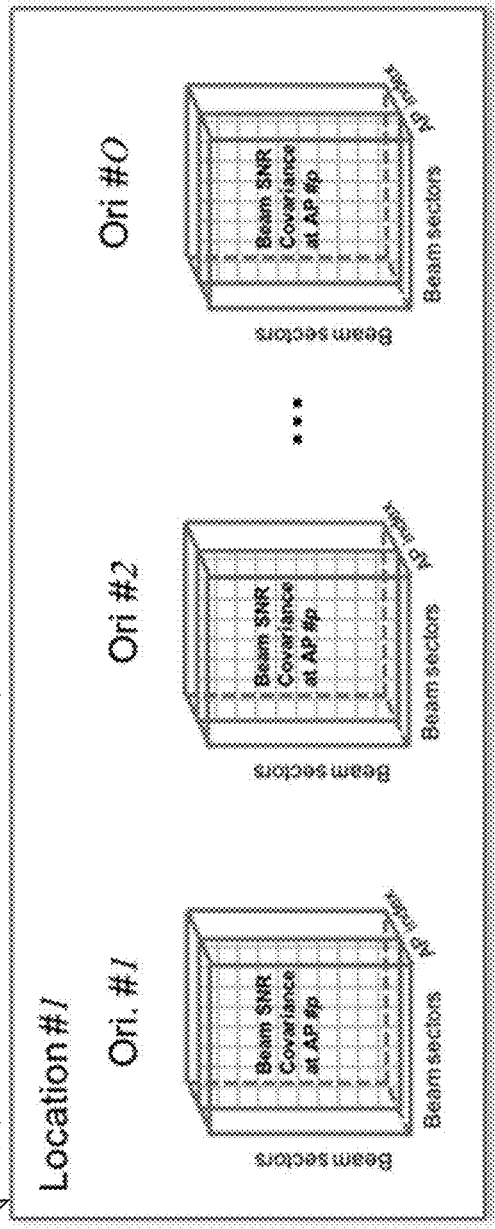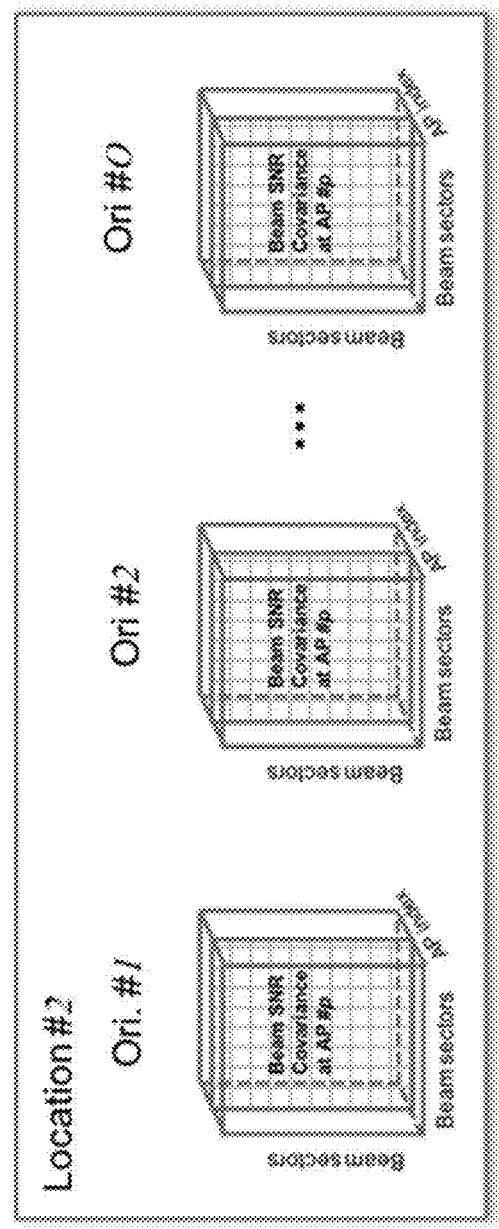

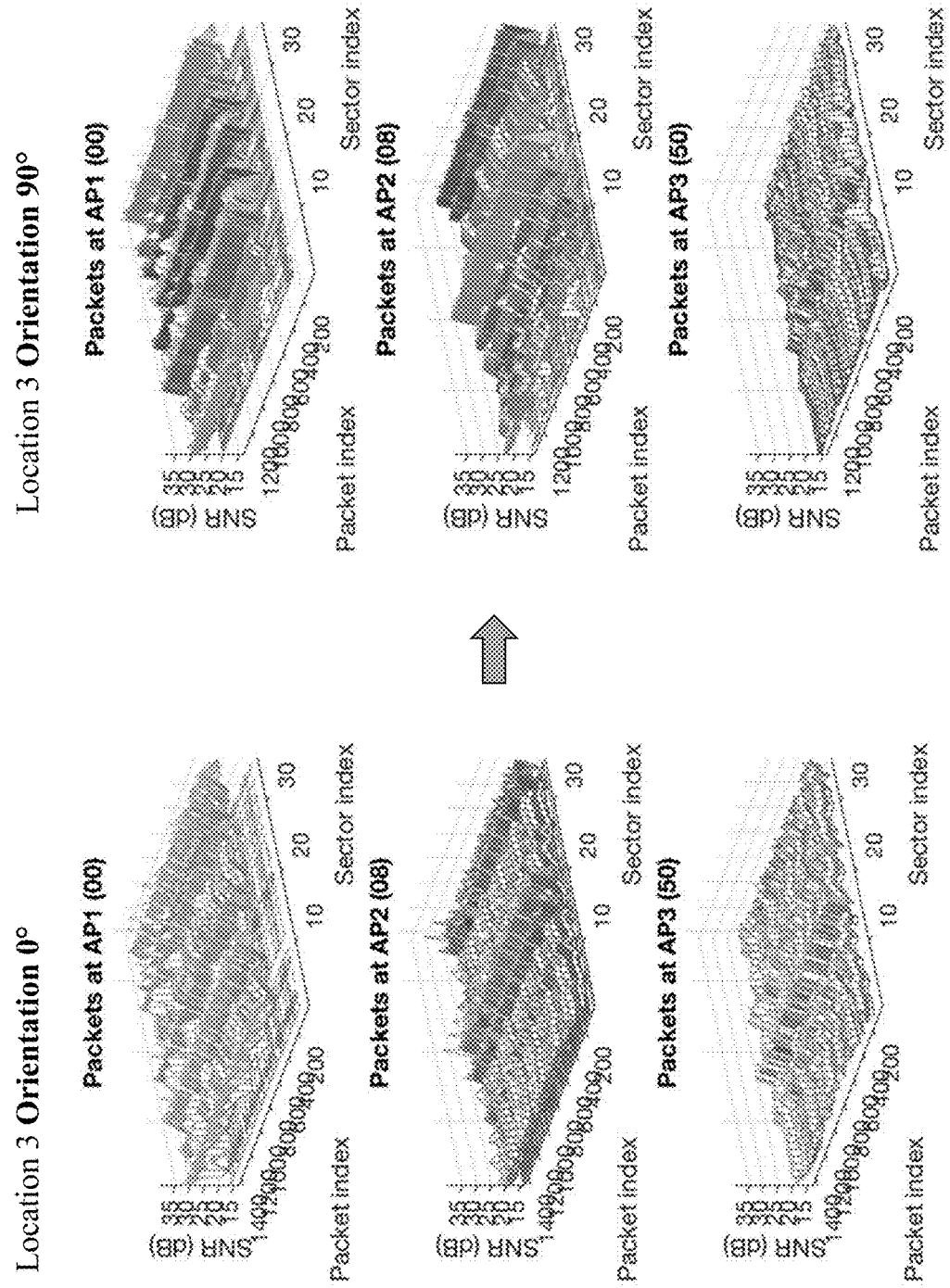

LOCALIZATION USING MILLIMETER WAVE BEAM ATTRIBUTES

FIELD

The present disclosure relates generally to communications systems, and more particularly to millimeter wave fingerprinting-based indoor localization with beam signal measurements.

BACKGROUND

Millimeter waves (mmWaves) are radio waves with wavelength in the range of 1 millimeter (mm)-10 mm, which corresponds to a radio frequency of 30 Giga-Hertz (GHz)-300 GHz. Per the definition by the International Telecommunications Union (ITU), these frequencies are also referred to as the Extremely High Frequency (EHF) band.

The mmWaves exhibit unique propagation characteristics. For example, compared with lower frequency radio waves, mmWaves suffer higher propagation loss, have a poorer ability to penetrate objects, such as buildings, walls, foliage, and are more susceptible to atmosphere absorption, deflection and diffraction due to particles (e.g., raindrops) in the air. On the other hand, due to the smaller wavelengths of the mmWaves, the antenna size is much smaller, wherein more antennas may be packed in a relatively small area, thereby allowing for the implementation of a high-gain antenna in small form factor.

The technical field of indoor localization deals with developing systems and methods for localizing an object in an enclosed indoor area. The object can be a device that transmits and/or receives signals to/from some other device(s), or an entity without such a capability. The localizing refers to estimating the coordinates of an object in some pre-defined reference frame. Localization, alternatively, is a proximity detection problem, that aims to localize an object at a sub-area level, within a larger indoor area. A number of indoor localization industry applications require precise indoor localization, such as locating objects, in hospitals, warehouses, shopping malls, factories, to name a few.

Regarding outdoor localization, a Global Positioning System (GPS) is typically used; however, the GPS system is ineffective for indoor use because the electromagnetic waves transmitted from the satellites in the GPS constellation do not penetrate indoors.

Conventional localization approaches use the lower frequency radio waves (e.g., sub-6 GHz). Localization approaches using mmWave are more recent advances, driven by the commercialization of 5G and WiFi at mmWave bands (e.g., 28 GHz and 60 GHz).

Some conventional indoor localization approaches require the installation of dedicated hardware in an indoor area. However, these types of conventional approaches are undesirable due to having to buy and then install the dedicated hardware into the indoor localization system. Besides the high expense of purchasing and installing, the simple fact of having a dedicated system for a localization task is simply very undesirable. An example of this approach is ultra-wide band (UWB) radio localization systems which are expensive and are used as a last resort option for the indoor localization community. Other examples include systems based on LIDAR, radar or ultrasound, like the conventional indoor localization approaches requiring dedicated hardware, these systems also require high installation and maintenance cost. In the area of mmWave communication, a system described in CN102914762A discloses an mmWave-based indoor localization system. However, that system described in the CN102914762A reference requires installation of a dedicated infrastructure operating at mmWave frequencies which is undesirable.

The infrastructure used for localization plays a major role in the selection of an indoor localization method, along with the accuracy that can be achieved. For example, some conventional fingerprint-based positioning systems exploit an already existing infrastructure dedicated for some other tasks. A representative example is WiFi infrastructure, where the access points are dedicated for enabling wireless connectivity in a local area network. However, these fingerprint-based positioning systems and architectures try to resolve the problem of determining location, but often fail in obtaining a level of acceptability of today's indoor localization community increasing technological needs. These failures typically vary widely in many parameters including accuracy, cost, size, re-configurability, security and reliability. One of the major problems in exploiting the availability of local area network is the signals' instability, which concerns localization accuracy, i.e signal fluctuations that often occur with increase errors and inaccuracies in the path of the user.

Therefore, there is a need for indoor localization systems and methods that can utilize infrastructure-free indoor localization to construct a feature space for a location-dependent fingerprinting database, from low cost and implementation perspectives.

SUMMARY

The present disclosure relates to methods and systems for mmWave fingerprinting-based indoor localization with mmWave beam attributes including, but not limited to, (1) beam signal-to-noise ratio (SNR) measurements or (2) received signal strength indicator (RSSI) measurements along with beam indices the transceivers on both ends use to establish mmWave link. In industrial standards (e.g., IEEE 802.11ad), such mmWave beam attributes are required to be measured at access points (APs) and clients (e.g., cell phones or laptops) in order to establish reliable mmWave communication links.

In particular, some embodiments use intermediate channel measurements, e.g., spatial beam SNRs that are inherently available in the IEEE 802.11ad standard, to construct a feature space for a location-dependent fingerprinting database. Through experimentation, at least one realization realized is that the use of spatial beam SNRs, conveniently available during a beam training phase in 5G and 802.11ad standards, can be used as location fingerprints with zero overhead. More specifically, during a so-called beam training phase, a pre-determined set of varying spatial beam patterns can be used to probe the environment. Such that, for each probing beam pattern, a spatial beam SNR is recorded and the beam pattern yielding a strongest beam SNR can be selected for subsequent data transmission. Wherein, based on the availability of open source software, the open source software framework can be used to extract such beam SNR measurements (e.g., at 60-GHz WiFi band), to build an experimental platform consisting of multiple APs, that can be used to collect comprehensive indoor measurements in an environment. Note that these measurements, i.e. real-world measurements, can account for hardware constraints such as quantization of beam SNR values (e.g., beam SNRs that are acquired at a resolution of 0.25 dB) and non-ideal system factors such as non-ideal antenna beam patterns and irregular antenna housing. Thus, with these real-world beam SNR measurements at several locations-of-interest within the environment, a fingerprinting dataset can be constructed in an offline training phase. For an online localization phase, both position classification and coordinate estimation can be considered using statistical estimation and machine learning approaches.

In regard to the fingerprinting dataset, at least one embodiment can construct the fingerprinting dataset using the SNR measurements, as noted above. Wherein data is stored in a memory including values indicative of the SNR measurements of a set of beams emitted at different beam angles by the phased antenna array and measured at a set of locations and orientations, that provide for a mapping between different combinations of SNR values of the set of beams and the set of locations and orientations. Such that a location and orientation from the set of locations is mapped to a unique combination of the SNR values of the set of beams.

However, discovered from experimentation, is that other measurements can be used to construct the fingerprinting dataset in the offline training phase, aside from just using the SNR measurements. For examples, the other measurements may be one or a combination of, beam RSSI measurements, beam channel state information (CSI) measurements, SNR measurements, RSSI measurements, CSI measurements, beam patterns, beam sequencing, and packet information (timing, sequencing). Wherein, at least one embodiment can construct the fingerprinting dataset using these other measurements, i.e. one or a combination of, as values indicative of measurements of a set of beams emitted at different beam angles by the phased antenna array and measured at a set of locations and orientations, that provide for a mapping between different combinations of values of the set of beams and the set of locations and orientations. Wherein a location and orientation from the set of locations and orientations can be mapped to a unique combination of the SNR values of the set of beams.

Also, discovered from experimentation is that the stored data can also be used as values indicative of "beam attributes". The "beam attributes" may be associated with the beam signal measurements with states of devices and/or states of environments.

The "states of the devices" can include types of behavior associated with each device (wherein a user can be associated with each device), locations and poses of each device in each environment. For example, each device can be associated with a user, such that the user is one of a robot, a human, a computer, a computer like device or an electronic device adaptable to a human. Wherein some types of behavior associated with each device can include, by-non-limiting example: (1) locations and poses of a specific user holding a device in the environment; (2) a device may be attached, embedded or somehow part of a human, i.e. may be an implant, a component of a prosthetic, etc., such that locations and poses of the human with the device can be obtained; (3) a device could be a computer device that is static or dynamic within an environment, i.e. commercial or business environment, including manufacturing, hospital, assembly line, transportation system, product transportation, i.e. the computer device could be part of a tracking/monitoring network, etc.; (4) a device could be adaptable to a human such as part of a wrist device, or some other types of devices or clothing worn by a human.

The "states of environments" can include locations of physical objects and types of behavior of ambient users in each environment. The locations of physical objects in each environment, can include objects found in a particular type of environment. By-non-limiting example: (1) in an office environment, the objects may include furniture, pillars, doors, machinery, robots, etc.; and (2) in an industrial or manufacturing environment, the objects can include any component either static or dynamic within the environment. As noted above, a user may be one of a robot, a human, a computer, a computer like device or an electronic device adaptable to a human. Wherein, by-non-limiting example, the types of behavior of ambient users can include: (1) a robot, i.e. a static robot having moving components or a dynamic robot, movements within the environment; (2) a human or a group of humans movement within the environment; (3) a computer may be associated with a dynamic device that moves within the environment; (4) an electronic device adaptable to static devices having moving components, mobile devices, humans, etc., that are located in an the environment, i.e. commercial, business or residential.

According to some embodiments of the present disclosure, the fingerprinting dataset in the offline training phase is stored in a memory, and can be used, by non-limiting example, with control circuitry connected to the phased antenna array and the memory. Wherein, the control circuitry performs a beam training with a target device located in the environment to measure beam signal values and environmental responses for different beams transmitted over the different beam angles. In response to the beam training, selects at least one dominant angle for a beamforming communication with the target device. Estimates from the stored fingerprinting data in the memory, a state of a target device, a state of the environment, or a combination of both states corresponding to the environmental responses for different beams estimated during the beam training. Then, transmits the estimated states of the target device and environment using the phased antenna array via a beamforming transmission over the at least one dominant angle to communicate the state of the target device, the state of the environment, or both states.

Experimentation

However, in order to better understand how and why some of the above embodiments were discovered, one needs to review the experimentation that led to some of the discoveries noted above. For example, at the start of experimentation some fingerprinting-based methods tested appeared to provide an efficient solution for online localization with low computational complexity. Though, what was later discovered is that these fingerprinting-based methods all required an enormous amount of time and resources to construct an offline database with chosen fingerprinting features at locations-of-interest within an environment to enable fast online localization. Upon further review of these tested WiFi-based fingerprinting systems, RSSI measurements were used as a feature to construct an offline training database, mostly due to the fact that this is the most easily accessible measurement from IEEE 802.11ac devices at sub-6 GHz, and also because of the low hardware requirements on data collection. Further, some machine learning methods such as the k-nearest neighbor (kNN) were applied to the RSSI-based fingerprinting data and showed some improved localization accuracy based on the particular experimentation. Some aspects learned from this experimentation revealed common issues using the RSSI, such as: 1) instability of using RSSI measurements at a given location; and 2) the coarse-grained channel information provided by the RSSI measurements. Also realized were further challenges that needed to be overcome, for example, the RSS are a coarse value which only simply measures the received power for a whole channel. In other words, the RSS fluctuates over time in typical indoor environments with rich multipath effects and are not unique for a specific location.

Another experimentation tested included the use of full channel state information (CSI) for fingerprinting-based localization at 2.4-GHz and 5-GHz frequency bands. An initial impression was that it would be easier to obtain such CSI measurements from open-source WiFi network interface cards (NICs), such as Intel WiFi Link 5300 NIC. Wherein, these NICs provided subcarrier channel frequency responses (CFR) in an orthogonal frequency-division multiplexing (OFDM) system and captured a multipath effect via wideband channel responses. When compared with RSSI measurements experimentation, these CSI measurements appeared to be more stable and provide location-dependent features. One experimentation included using a Fine-grained Indoor Fingerprinting System (FIFS), the FIFS system leveraged a weighted average of CSI amplitudes over three antennas, that included different amplitudes and phases at multiple propagation paths, known as the frequency diversity, to uniquely manifest a location. Further, the multiple antennas appeared to also provide a spatial diversity that could be further augmented in fingerprinting.

Still, another experimentation tested included a deep learning based indoor fingerprinting system that used CSI, i.e. DeepFi. This experimentation used a DeepFi system architecture that included an off-line training phase and an on-line localization phase. In the off-line training phase, deep learning was utilized to train all the weights of a deep network as fingerprints. Where, a greedy learning algorithm was used to train the weights layer-by-layer to reduce complexity. In the on-line localization phase, a probabilistic method based on a radial basis function was used to obtain an estimated location. In the FIFS experimentation, the CSI amplitude values from three antennas were simply accumulated to produce an average value. In contrast, for the DeepFi experimentation had aimed to utilize their variability to enhance the training and test process in deep learning. For example, 30 subcarriers were treated as 30 nodes and used as input data of visible variability for deep learning. Wherein, with the three antennas, there were 90 nodes that could be used as input data for deep learning. Which seemed that the experimented DeepFi approach appeared to exploit 90 CSI amplitudes from all the subcarriers at all the three antennas with a deep auto-encoder network. However, upon reflection of developing the embodiments of the present disclosure was that the CSI measurements were available in 2.4/5 GHz communication systems, and online in mmWave systems that are envisioned to dominate the future WiFi market.

However, practical implementation of the CSI-based fingerprinting method later turned out to be very challenging when using with current mmWave technology and communication standards. Namely, only a limited number of radio frequency (RF) chains were implemented into mmWave transceiver due to hardware-related constraints. Which this precluded them from processing signals from all antenna elements in discrete-time domain and obtaining mmWave channel angular spectrum. Instead, what was realized and required by industrial standards is that the mmWave transceiver implements a finite number of possible beampatterns such that two mmWave devices can establish a communication link based on probing different combinations of beams and choosing the best link based on the received signal quality. In addition, even those limited channel measurements were not (easily) accessible from commercial mmWave chipsets, which posed additional challenges to mmWave-aided localization.

Experimentation showed that in regard to higher frequency bands beyond 5-GHz frequency band, e.g., 28-GHz band for 5G wireless communications and 60-GHz for 802.11ad WiFi, obtaining real-world fingerprinting measurements, such as full CSI, proved significantly more challenging and required dedicated prototyping device platforms. Namely, to acquire CSI in mmWave receiver, a separate radio frequency (RF) chain was needed in each antenna element. Also, due to the large bandwidth of mmWave communication signals, an analog-to-digital converter (ADC) in each RF chain needs to have a relatively high sampling rate and, in turn, consume large amounts of power. Overall, after several types of experimentation, the resulting baseline consensus was that such a system would be too expensive and very impractical for commercial use with current mmWave technology.

Discoveries & Realizations

What was discovered is that one of the unique features of these mmWave applications was to employ high-resolution beam patterns, via either analog beamforming, or hybrid beamforming, which could be used to compensate for higher path loss. More specifically, during an experimental beam training phase, a pre-determined set of varying spatial beam patterns were used to probe the environment. Such that, for each probing beam pattern, a spatial beam SNR was recorded, the beam pattern yielding the strongest beam SNR was selected for subsequent data transmission. For a given probing beam pattern, spatial beam SNR was a RSSI-like coarse-grained channel measurement. However, this turned out to be a benefit due to the use of multiple varying beam patterns, wherein a set of spatial beam SNRs can embed more spatial channel responses than the traditional RSSI measurement. Further still, another realized benefit is that the spatial beam SNRs were inherently available in the 5G and IEEE 802.11ad standard, which enabled a zero overhead for the overall hardware and software infrastructure.

Thus, based on different experimentation, spatial beam SNRs were decided to be used, for many reasons, one reason for being conveniently available during a beam training phase in 5G and 802.11ad standards, and can be used as location fingerprints at a zero overhead. Another reason is spatial beam SNRs can be based on open source software that is easily available, and the open source software framework could be used to extract 60-GHz beam SNR measurements. For example, an experimental platform was built consisting of multiple APs, in order to collect comprehensive indoor measurements in a test environment, i.e. the test environment was an office environment tested during regular office hours. Note that these real-world measurements accounted for hardware constraints such as quantization of the beam SNR values, e.g., beam SNRs were delivered with a resolution of 0.25 dB, and non-ideal system factors such as non-ideal antenna beam patterns and antenna housing. With these real-world beam SNR measurements at several locations-of-interest within the test environment, a fingerprinting dataset in the offline training phase was constructed. For the online localization phase, both position classification and coordinate estimation were undertaken using a weighted nearest neighboring and Gaussian process regression approaches, as noted above.

In an alternative embodiment, the locations of interest are fingerprinted using RSSI measurements of the established mmWave link between two devices and indices of the built-in beam patterns the two devices use for establish such a link. The reason is that the RSSI and beam indices are more easily available from commercial devices than the SNR values of the probed beams. Also, while it has been experimentally shown that fingerprint-based localization using RSSI measurements only does not provide satisfactory localization performance, including beam indices reduces the search space of indoor location and, in turn, considerably improves the localization performance.

Some embodiments include a system using beamforming transmission in a mmWave spectrum in an environment. The system includes a phased antenna array that performs beamforming to establish millimeter wave channel links with devices at different locations in the environment. A memory can have stored data that includes fingerprinting data. The fingerprinting data can include values indicative of SNR measurements of a set of beams emitted at different beam angles by the phased antenna array and measured at a set of locations in the environment. Wherein the stored values indicative of SNR measurements of a set of beams emitted at different beam angles by the phased antenna array and measured at a set of locations, that provide for a mapping between different combinations of SNR values of the set of beams and the set of locations. Such that a location from the set of locations is mapped to a unique combination of the SNR values of the set of beams.

Control circuitry communicatively connected with the phased antenna array and the memory, configured to perform a beam training with a target device located in the environment to estimate SNR values for different beams transmitted over the different beam angles. During the beam training, the transmitter and receiver probe a certain number of beams transmitted with different beamforming angles. For example, during the beam training, the transmitter sends training sequence in each beam sequentially and the receiver steers sequentially in all tested beams and measures strength of the signal from each steered beam. The beam training yields a path between the transmitter and receiver over which they establish a communication link.

The control circuitry can select, in response to the beam training, at least one dominant angle for a beamforming communication with the target device. Wherein the selecting is based on the signal strength (such as RSSI or SNR or some other metric) measured for each probed beam such that the beam that delivers the strongest signal is used to closing the link between the two devices.

The control circuitry can estimate from the mapping stored in the memory, a location of the target device corresponding to the SNR values for different beams estimated during the beam training. Wherein the estimating is based on one of machine learning or deep learning methods, aimed to map measured SNR values to the unknown location and orientation of the device.

The control circuitry can also estimate from the mapping stored in the memory, a location of the target device corresponding to the RSSI and beam indices values corresponding to the established link during the beam training. Wherein the estimating is based on the disclosed probabilistic method, aimed to map measured RSSI and beam indices to the unknown location and orientation of the device. Wherein the control circuitry transmits the location of the target device using the phased antenna array via a beamforming transmission over the at least one dominant angle to communicate the location of the target device.

According to an embodiment of the present disclosure, a communication system using beamforming transmission in a millimeter wave spectrum in an environment, that includes a phased antenna array configured to perform beamforming to establish millimeter wave channel links with devices at different locations in the environment. The communication system including a memory connected to the phased antenna array, having stored data. The stored data include values indicative of signal to noise ratio (SNR) measurements of a set of beams emitted at different beam angles by the phased antenna array and measured at a set of locations, that provide for a mapping between different combinations of SNR values of the set of beams and the set of locations. Such that a location from the set of locations is mapped to a unique combination of the SNR values of the set of beams. Control circuitry communicatively connected with the phased antenna array and the memory, configured to perform a beam training with a target device located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device using the phased antenna array via a beamforming transmission over the at least one dominant angle.

According to another embodiment of the present disclosure, an electronic system using beamforming transmission in a millimeter wave spectrum is configured to communicate with devices and a target device in an environment, that includes antennas configured to transmit and receive millimeter wave signals. The electronic system including a memory connected to the antennas, having stored data. The stored data include values indicative of signal to noise ratio (SNR) measurements of a set of beams emitted at different beam angles by the antennas and measured at a set of locations, that provide for a mapping between different combinations of SNR values of the set of beams and the set of locations. Such that a location from the set of locations is mapped to a unique combination of the SNR values of the set of beams. Control circuitry connected with the antennas and the memory, is configured to perform a beam training with the target device located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device using the antennas via a beamforming transmission over the at least one dominant angle.

Another embodiment of the present disclosure a method using a communication system having beamforming transmission in a millimeter wave spectrum in an environment, that includes a phased antenna array configured to perform beamforming to establish millimeter wave channel links with devices at different locations in the environment. The method including performing a beam training with a target device located in an environment to estimate SNR measurement values for different beams transmitted over the different beam angles using control circuitry connected with the antennas. The control circuitry is configured for selecting, in response to the beam training, at least one dominant angle for a beamforming communication with the target device. Accessing a memory connected to the phased antenna array, the memory having stored data. The stored data include values indicative of SNR measurements of a set of beams emitted at different beam angles by the phased antenna array and measured at a set of locations in the environment. Wherein the stored values provide a mapping between different combinations of SNR values of the set of beams and the set of locations. Such that a location from the set of locations is mapped to a unique combination of the SNR values of the set of beams. Estimating from the mapping stored in the memory, a location of the target device corresponding to the SNR values for different beams estimated during the beam training. Transmitting the estimated location of the target device using the phased antenna array via a beamforming transmission over the at least one dominant angle.

Another embodiment of the present disclosure includes a communication system using beamforming transmission in a millimeter wave spectrum in an environment, that includes antennas configured to perform beamforming to establish millimeter wave channel links with devices at different locations in the environment. The communication system including a memory connected to the antennas, having stored fingerprinting data. The stored fingerprinting data include values indicative of link attributes associated with beam signal measurements with states of devices and states of environments. The states of the devices include types of user behavior associated with each device, locations and poses of each device in each environment. The states of the environments include locations of physical objects and types of behavior of ambient users in each environment. Control circuitry communicatively connected with the antennas and the memory, is configured to perform a beam training with a target device located in the environment to measure beam signal values and environmental responses for different beams transmitted over the different beam angles. Select, in response to the beam training, at least one dominant angle for a beamforming communication with the target device. Estimate from the stored fingerprinting data in the memory, a state of the target device, a state of the environment, or a combination of both states corresponding to the environmental responses for different beams estimated during the beam training. Transmit the estimated states of the target device and environment using the antennas via a beamforming transmission over the at least one dominant angle to communicate the state of the target device, the state of the environment, or both states.

Another embodiment of the present disclosure a method using a communication system having beamforming transmission in a millimeter wave spectrum in an environment, that includes antennas configured to perform beamforming to establish millimeter wave channel links with devices at different locations in the environment. The method including performing a beam training with a target device located in an environment to measure beam signal values and environmental responses for different beams transmitted over the different beam angles using control circuitry connected with the antennas. The control circuitry is configured for selecting, in response to the beam training, at least one dominant angle for a beamforming communication with the target device. Accessing a memory connected to the antennas, the memory having stored fingerprinting data. The stored fingerprinting data include values indicative of link attributes associated with beam signal measurements with states of devices and states of environments. The states of the devices include types of user behavior associated with each device, locations and poses of each device in each environment. Wherein the states of the environments include locations of physical objects and types of behavior of ambient users in each environment. Estimating from the mapping stored fingerprinting data in the memory, a state of the target device, a state of the environment, or a combination of both states corresponding to the environmental responses for different beams estimated during the beam training. Transmitting the estimated states of the target device and environment using the antennas via a beamforming transmission over the at least one dominant angle to communicate the state of the target device, the state of the environment, or both states.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3D is a table illustrating a method of the fingerprint measurements recorded at when client was at Location 1 and Orientation 0°, referring to FIG. 3A, according to some embodiments of the present disclosure;

FIG. 6A is a schematic illustrating measurements corresponding to one access point, in a table which has I=3 rows, one row for each beam training cycle and whose columns represent RSSI values, transmit beam index for the considered AP and the transmit beam index for the client, according to some embodiments of the present disclosure;

FIGS. 7B-7D are graphs illustrating the training dataset of FIG. 7A, the training dataset is illustrated for each location and orientation of the client, such that all the beams SNRs collected over time at multiple APs are used to construct the training dataset, according to some embodiments of the present disclosure;

FIG. 7G and FIG. 7H are graphs illustrating that beam SNRs at each AP have strong sensitivity to the user's orientation, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates generally to communications systems, and more particularly to millimeter wave fingerprinting-based indoor localization with beam SNR measurements. In particular, the present disclosure discloses a low-cost fingerprint-based localization method, where in addition to the RSS measurements, also discloses fingerprint beam indices that two mmWave devices select from a finite set of feasible beams during their beam alignment procedure.

Figure 1A:
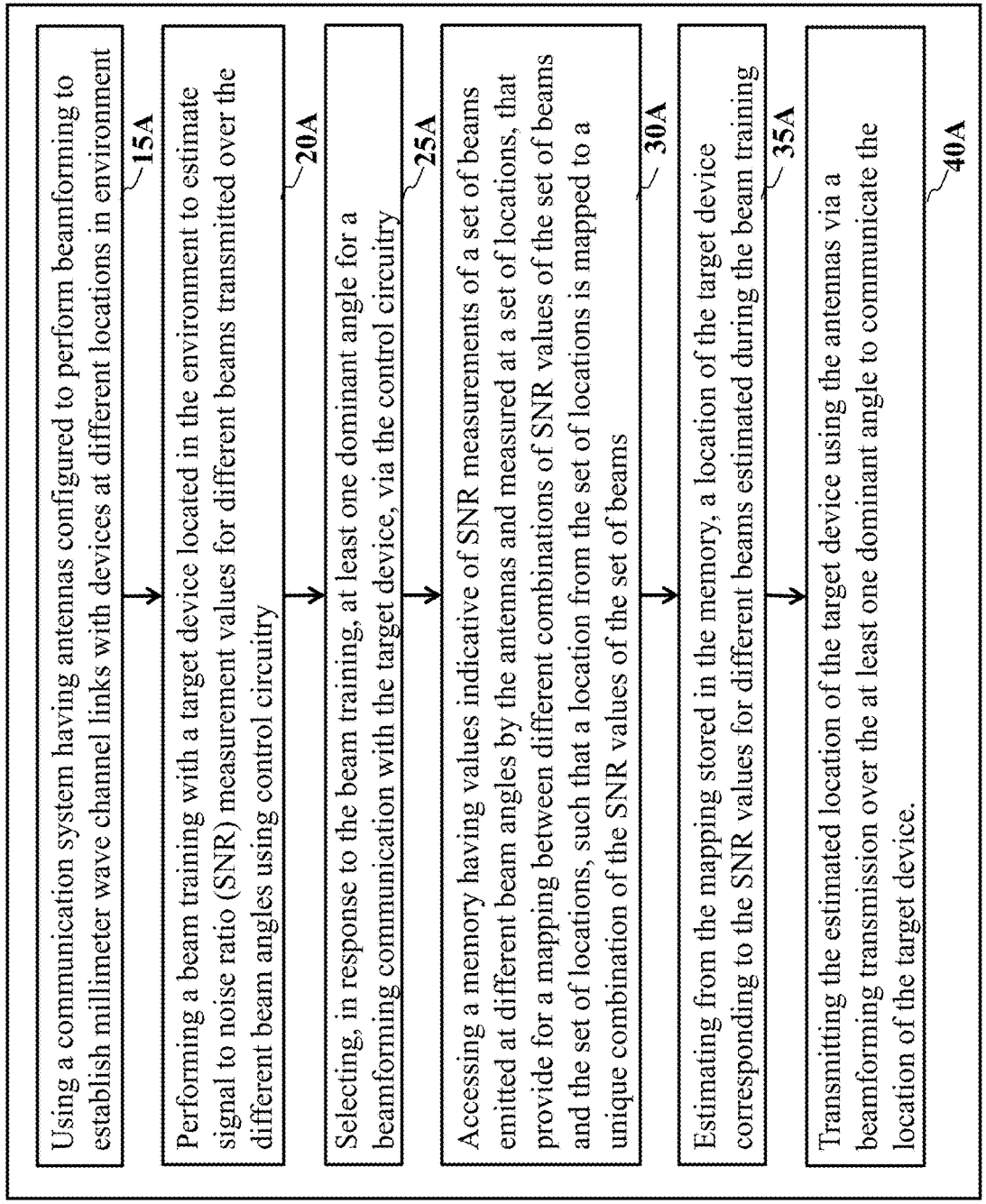
FIG. 1A is a block diagram illustrating a method, according to an embodiment of the present disclosure.

FIG. 1A is a block diagram of a method, according to an embodiment of the present disclosure.

Step 15A of FIG. 1A includes using a communication system having beamforming transmission in a millimeter wave spectrum in an environment, that includes a phased antenna array configured to perform beamforming to establish millimeter wave channel links with devices at different locations in the environment.

Step 20A of FIG. 1A includes performing a beam training with a target device located in an environment to estimate signal to noise ratio (SNR) measurement values for different beams transmitted over the different beam angles using control circuitry connected with the antennas.

Step 25A of FIG. 1A includes the control circuitry is configured for selecting, in response to the beam training, at least one dominant angle for a beamforming communication with the target device.

Step 30A of FIG. 1A includes accessing a memory connected to the phased antenna array, the memory having stored data that includes values indicative of SNR measurements of a set of beams emitted at different beam angles by the phased antenna array and measured at a set of locations in the environment, wherein the stored values provide a mapping between different combinations of SNR values of the set of beams and the set of locations, such that a location from the set of locations is mapped to a unique combination of the SNR values of the set of beams.

Step 35A of FIG. 1A includes estimating from the mapping stored in the memory, a location of the target device corresponding to the SNR values for different beams estimated during the beam training.

Step 40A of FIG. 1A includes transmitting the location of the target device using the phased antenna array via a beamforming transmission over the at least one dominant angle to communicate the location of the target device.

Figure 1B:
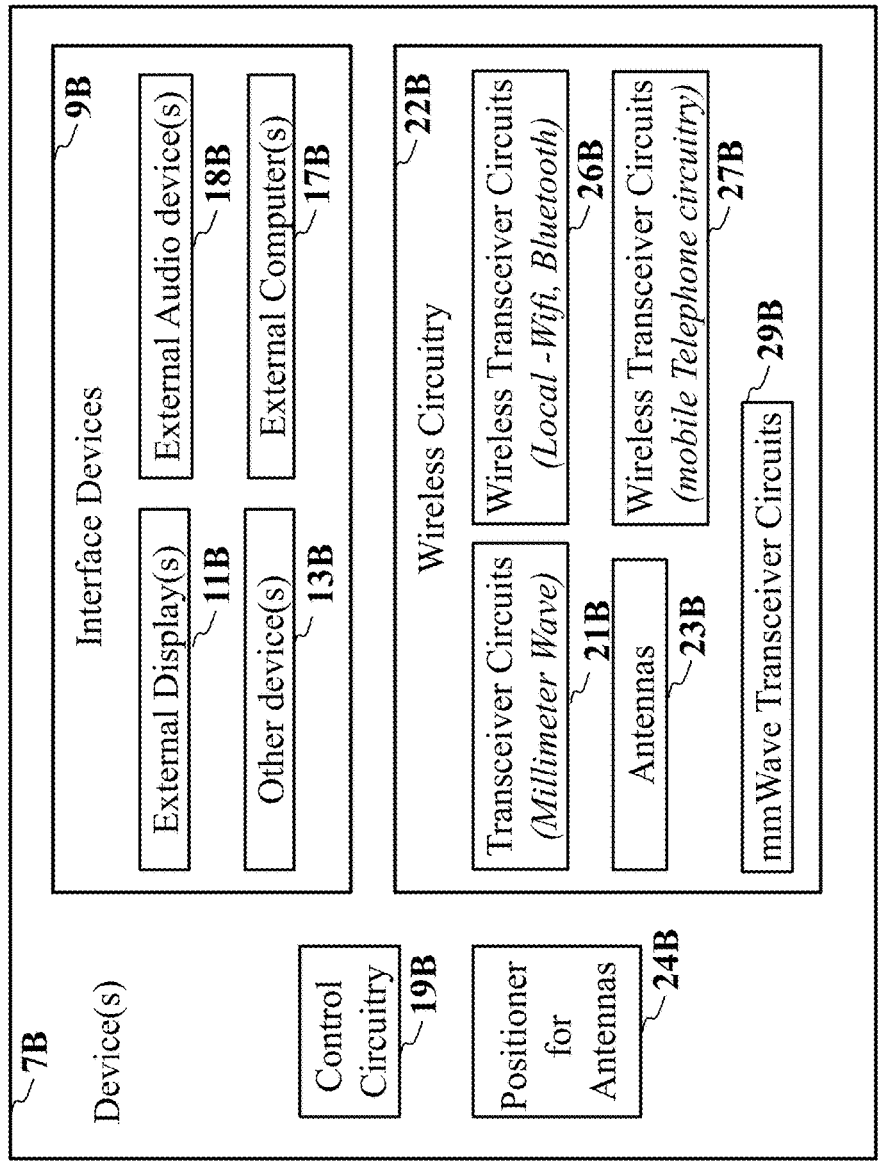
FIG. 1B is a schematic illustrating some components used for implementing the method of FIG. 1A, according to some embodiments of the present disclosure.

FIG. 1B is a schematic illustrating the device having some components with wireless communication circuitry used for implementing the methods of FIG. 1A, according to some embodiments of the present disclosure. The device 7B can include control circuitry 19B, that can include storage, i.e. flash memory, nonvolatile/volatile memory, hard disk drive storage, programmable-read-only memory, etc. The control circuitry 19B can be configure to utilize the processing circuitry to control the operation of device 7B, such as microcontrollers/processors, signal processors, etc.

Control circuitry 19B can be used to run software on the device 7B, where the control circuitry can be configure to support communications with other equipment, such as implementing communication protocols, i.e. wireless local area network protocols (IEEE 802.11, IEEE 802.11ad, wireless telephone, etc. The device 19B can include interface devices 9B having circuitry to communicate data to be supplied to the device 19B and/or allow data to be provided from the device 19B to external or other devices, i.e. external displays 11B, external audio devices 18B, other devices 13B, external computers 17B. The device 19B can include wireless communications circuitry 22B for communicating wirelessly with other equipment. The wireless communications circuitry 22B may include transceiver circuitry 21B formed from one or more integrated circuits, power amplifier circuitry, low-noise input amplifiers, passive RF components, one or more antennas 23B. Also, the wireless communications circuitry 22B can include wireless transceiver circuits 26B (local-WiFi, Bluetooth, wireless local area network, configured for 2.4 GHz, 5 GHz bands for IEEE 802.11, etc.), and wireless transceiver circuits 27B including mobile telephone circuitry.

Still referring to FIG. 1B, the wireless communications circuitry 22B may include mmWave transceiver circuitry 29B that supports communications at frequencies of 7 GHz to 300 GHz or other mmWave frequencies. For example, the mmWave transceiver circuitry 29B may support IEEE 802.11ad communications at 28 GHz or 60 GHz, and may be configure from an integrated circuit(s).

Antennas 23B can include the wireless communications circuitry 22B that can configure for use with multiple different types of antennas. For example, the different types of antennas can be used for different bands and combinations of bands. One type of antenna may be used in forming a local wireless link antenna and another type of antenna may be used in forming a remote wireless link antenna. Antennas 23B can include phased antenna arrays for handling millimeter wave communications. Also, the antenna signals can be routed via transmission line paths within device 7B, wherein the transmission line paths may be used to couple antenna structures 23B to transceiver circuitry. The device 7B can include multiple antennas 23B, such that the antennas may be used together or one of the antennas may be switched into use while other antenna(s) are switched out of use. For example, the control circuitry 19B can be used to select an ideal antenna to use in device 7B in real time and/or to select an ideal setting for adjustable wireless circuitry associated with one or more of antenna 23B. Antenna adjustments may be made to tune antennas to perform in desired frequency ranges, to perform beam steering with a phased antenna array, and to otherwise optimize antenna performance. Sensors may be incorporated into antennas 23B to gather sensor data in real time that is used in adjusting antennas 23B.

Still referring to FIG. 1B, the antennas 23B can include phased antenna arrays to implement beam steering functions, wherein the antennas used in handling mmWave signals for frequency mmWave transceiver circuits 29B may be implemented as phased antenna arrays. The radiating elements in a phased antenna array 23B for supporting millimeter wave communications may be patch antennas, dipole antennas, or other suitable antenna elements. The mmWave transceiver circuitry 29B can be integrated with the phased antenna arrays 23B to form integrated phased antenna array and transceiver circuit modules or packages.

Objects in the environment can block wireless signals such as mmWave signals, such that mmWave communications usually require a line of sight between antennas 23B and the antennas on an external device. Accordingly, the device 7B can have multiple phased antenna arrays, each of which can be placed in a different location within or on device 7B. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas 23B from one or more different locations in device 7B are operated together may also be used (e.g., to form a phased antenna array, etc.).

Still referring to FIG. 1B, to further improve mmWave communications, the device 7B may include positioners 24B that can include mechanically moveable (adjustable) structures that are controlled to mechanically adjust the position of antennas 23B with respect to device 7B and/or the external device (e.g., to maintain line of sight with the external device).

Control circuitry 19B can provide control signals to the positioners 24B to mechanically adjust the position or orientation of the antennas 23B by an actuating motion of the positioners 24B via electrical control signals that actuate a change in an orientation or position of antennas 23B. For example, the positioners 24B can adjust the orientation or position of one of antenna 23B, or multiple antennas at different times.

Figure 1C:
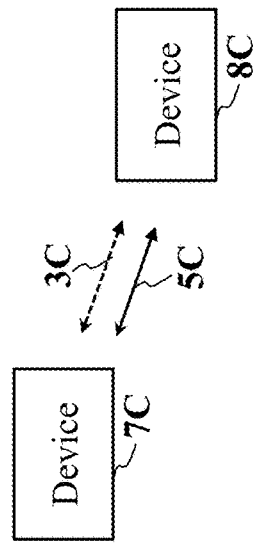
FIG. 1C is a schematic illustrating wireless communication between two devices that can communicate with channel links, according to some embodiments of the present disclosure.

FIG. 1C is a schematic illustrating wireless communication between two devices that can communicate with channel links, according to some embodiments of the present disclosure. Device 7C and device 8C can include antennas, each having a phase antenna array, such that both phase antenna arrays are designed for link establishment for mmWave communications and networks, for fingerprinting-based localization. Specific applications can include indoor localization of static and moving objects including people, robots, vehicles and drones, outdoor localization, tracking of static and moving objects. Both devices 7C, 8C are designed for use of commercially available beam SNR measurements, which is different from other measurement modalities used by conventional fingerprinting-based localization approaches. For example, some existing mmWave fingerprinting-based localization approaches use either CSI) which requires expensive prototyping mmWave platforms or RSSI that are coarse measurements with little information on spatial propagation paths.

The mmWave communications can include signals above 7 GHz, including 28 GHz, 60 GHz or other frequencies between about 7 GHz and 300 GHz. The devices 7C, 8C can include wireless communications circuitry for local wireless area network signals, near-field communications, cellular telephone signals, light-based wireless communications, satellite navigation system signals or other wireless communications. For example, the devices 7C, 8C can be wireless electronic devices, computers, laptops, or any type of device capable of being associated with communication circuitry that uses beam SNR designed for link establishment for mmWave communications and networks, for fingerprinting-based localization. Other examples can include devices designed for use by humans, either embedded into the human or carried or attached to the human. Further, the devices 7C, 8C can associated with a vehicle, a wireless AP, a base station such as a wireless router or other device for routing communications between other wireless devices and a larger network such as the internet or a cellular telephone network.

The devices 7C, 8C include wireless circuitry to perform mmWave communications over a wireless mmWave link such as mmWave link 3C, 5C. The mmWave link 5C may be, a bidirectional link or unidirectional link, that data is communicated from electronic device 7C to device 8C or vice a versa, at one or more mmWave frequencies. Further, devices 7C, 8C can perform wireless communications with other equipment over a non-mmWave link. Wireless link 3C can be a wireless local area network (WLAN) link i.e. a Wi-Fi link or a wireless personal area network (WPAN) link such as a Bluetooth link.

Figures 2A, 2B:
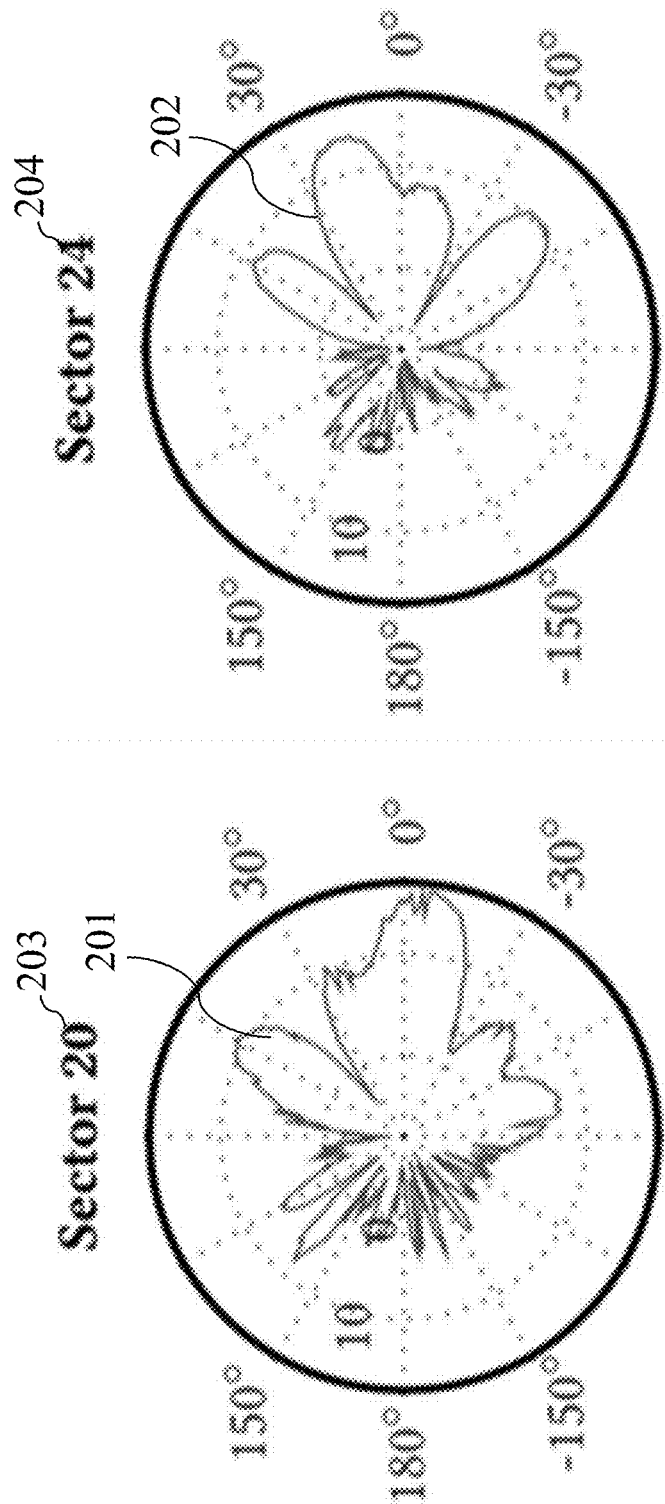
FIG. 2A and FIG. 2B illustrate shows magnitudes 201, 202 of two transmit beams 203, 204, labeled with beam indices 20 and 24 and experimentally measured in an anechoic chamber, according to some embodiments of the present disclosure.

FIG. 2A and FIG. 2B illustrate shows magnitudes 201, 202 of two transmit beams 203, 204, labeled with beam indices 20 and 24 and experimentally measured in an anechoic chamber, according to some embodiments of the present disclosure.

As an overview, the indoor localization method is based on a fully opportunistic use of commercial off-the-shelf (COTS) mmWave WiFi routers. In particular, the proposed method leverages information about mmWave links established between a client and one or more APs that could be extracted from commercial transceiver chipsets. Towards that end, we utilize TP-Link Talon AD7200 router, which is one of the first and most popular WiFi 60 GHz devices complying with the IEEE 802.11ad standard. The TP link router implements QUALCOMM QCA9500 transceiver that supports a single stream communication in 60 GHz range using analog beamforming over 32-element planar array. The TP-Link's transceiver receives in quasi-omnidirectional configuration and transmits by steering signal into one of 34 possible beams, realized using pre-stored beamforming weights. Notably, the resulting beams depart from the theoretical ones and exhibit fairly irregular shapes due to hardware imperfections at 60 GHz.

For example, FIG. 2A and FIG. 2B illustrate magnitudes 201, 202 of two transmit beams 203, 204, labeled with beam indices 20 and 24 and experimentally measured in an anechoic chamber. Two TP-Link devices establish mmWave communication link during beam alignment stage whereby one device is in the reception mode, i.e., implements quasi omni-directional beam, and measures the received signal levels of pilots sequentially transmitted over different beams by the other device. Upon this procedure, the two devices swap the roles the repeat the process. The beam alignment procedure yields beam indices to be used during data transmission, along with the RSS level measured over such a link. Following, we extract the recorded RSS and pair of transmit beam indices resulting from the TP-Link's beam alignment procedure and use that information for indoor localization. We emphasize that the developed algorithm can be generalized for the cases when mmWave transceivers employ different beam alignment procedures, for example when quasi-directional receive beams are also employed in addition to transmit beams.

Fingerprinting Stage

Figure 3A:
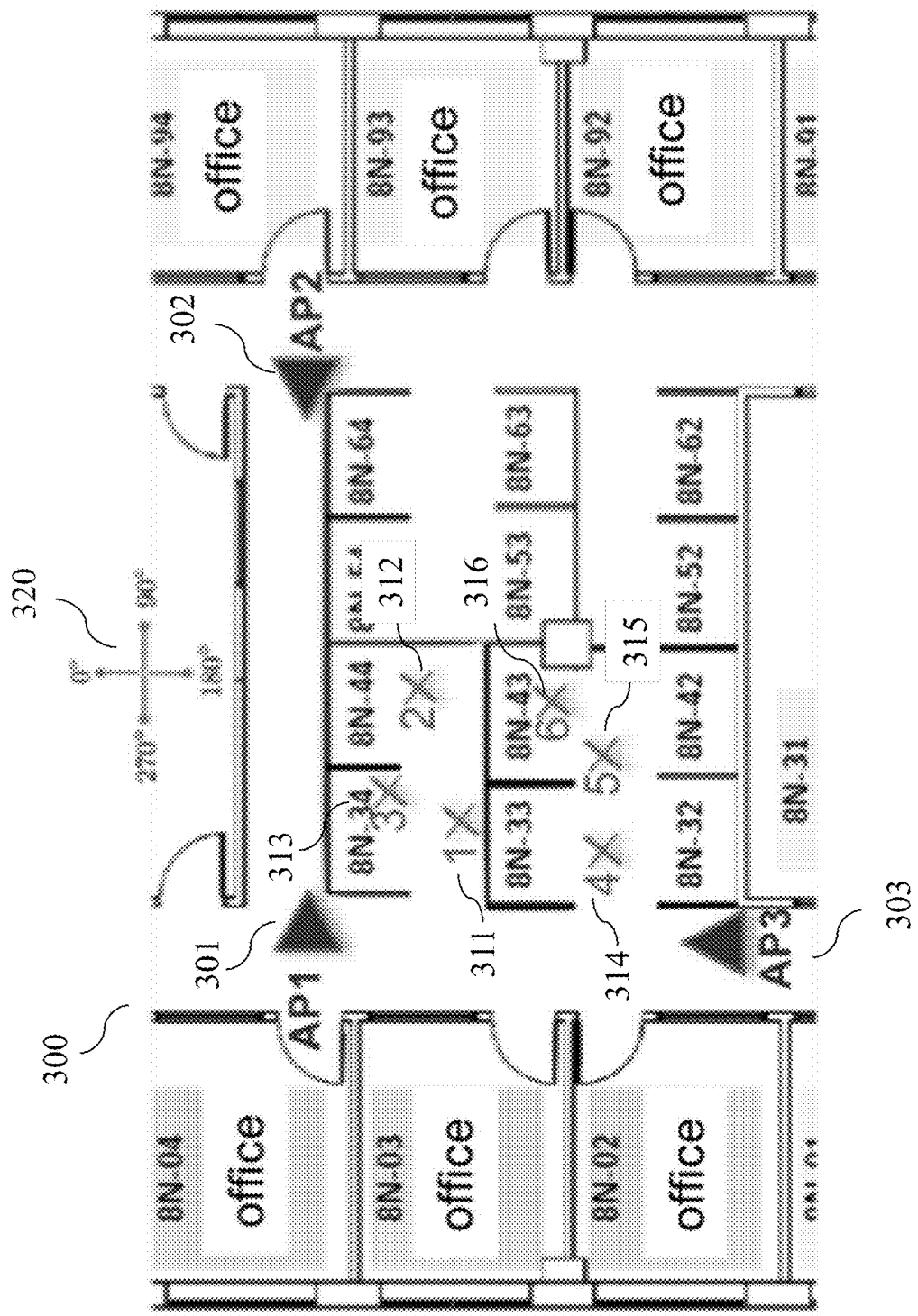
FIG. 3A is a schematic illustrating where three access points AP1, AP2 and AP 3 provide mmWave communication coverage in an office environment, according to some embodiments of the present disclosure.

FIG. 3A is a schematic illustrating where three access points AP1, AP2 and AP3 provide mmWave communication coverage in an office environment, according to some embodiments of the present disclosure. We assume their locations and orientations do not change between fingerprinting and actual localization. The fingerprinting in this embodiment consists of recording the measurements described in (1) for each fingerprint location 311, 312, 313, 314, 315, 316 and possible orientation at each location, where the orientation is defined with respect to some predetermined frame of reference 320.

Figure 3B:
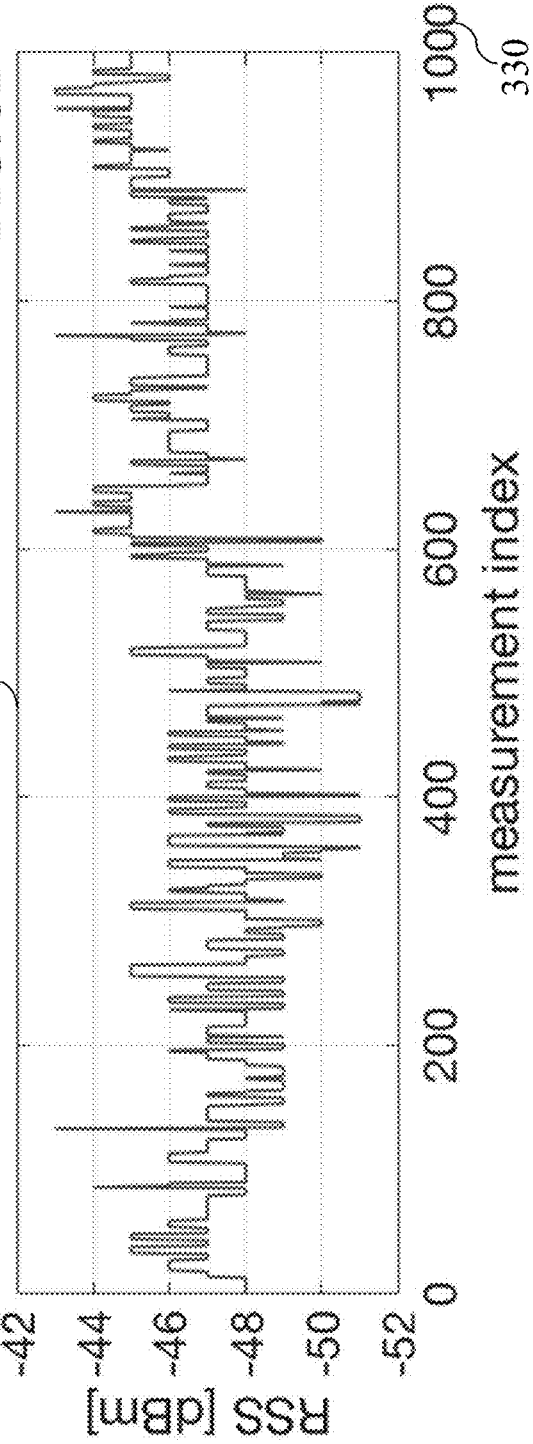
FIG. 3B and FIG. 3C are schematics illustrating fingerprinting measurements collected on one of locations and one of orientation of the client device and corresponding to one of the access points, in this case AP 3 from FIG. 3A, according to some embodiments of the present disclosure.
Figure 3C:
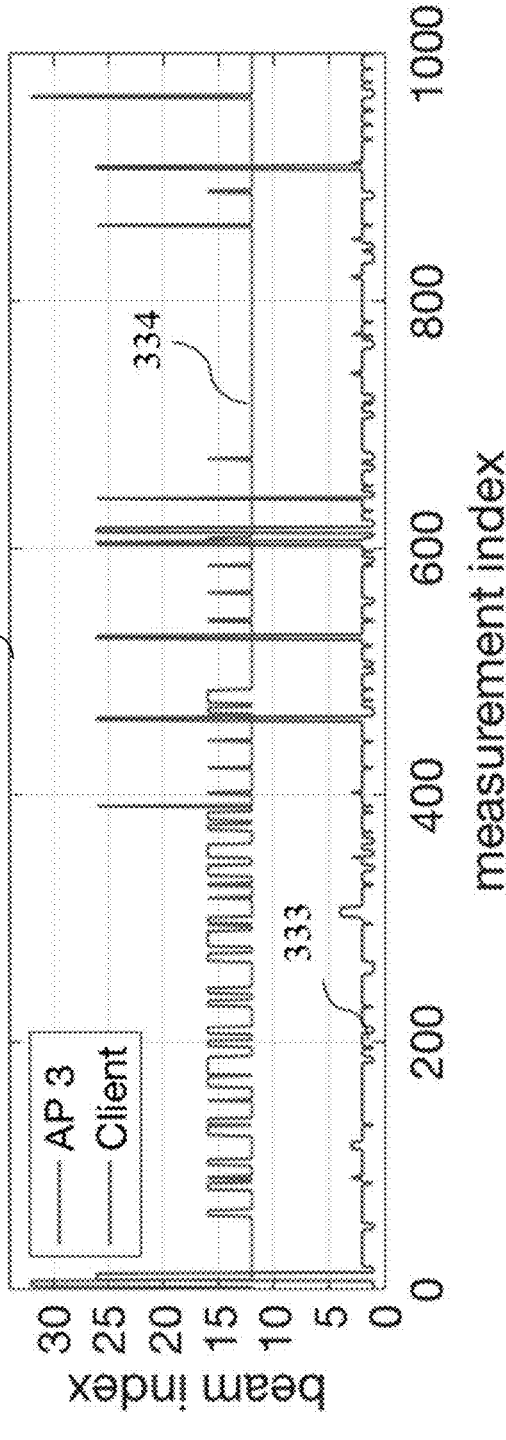

As we have previously elaborated, the devices probe different beam pairs during the beam alignment stage of the mmWave protocol, and the pair of beams over which the training signal is received with the highest RSS level is the one used for information exchange. During the fingerprint stage, measurements of N such beam pairs, along with the corresponding RSS levels, are recorded by forcing the devices to perform beam alignment N times. Due to dynamics in the environment, the most prominent one being movement of people, the mmWave link measurements are not time-invariant. On the other hand, due to the directivity of mmWave channel, it is unlikely to observe N significantly different recordings of beam pairs. In particular, our measurements in an office space environment with a usual people traffic during regular business hours indicate that only several different beam pairs ($b^{(AP)}$, $b^{(C)}$) emerge over N~1000 measurements FIG. 3B and FIG. 3C are schematics illustrating fingerprinting measurements collected on one of locations and one of orientation of the client device and corresponding to one of the access points, in this case AP 3 from FIG. 3A, according to some embodiments of the present disclosure. For example, FIG. 3B shows the number of measurements 330 is 1000 and each measurement comprises of RSS value 331, access point's transmit beam index 333 the access point uses to communicate data to the client, and the client's transmit beam index 334 the client uses to communicate information to the access point.

FIG. 3D is a table illustrating a method of the fingerprint measurements recorded at when client was at Location 1 and Orientation 0°, referring to FIG. 3A, according to some embodiments of the present disclosure. For example, each table 341, 342, 343 corresponds to the fingerprint measurements of RSS and beam indices between the client and one access point AP1, AP2, AP3. Each table comprises of three columns, where first column 345 records measured RSSI, second column 346 records transmit beam index used by the access point, while the third column 347 records transmit beam index used by the client. Each row in a table is associated with a mmWave communication link between the client and corresponding access point established after beam training. In other words, for the sake of collecting the fingerprint data, client and access point are forced to perform beam training a certain number of times, where each beam training results in one triplet of measurements in our experimental setup (RSS and two transmit beam indices). We note that if access point and client do not receive in an omnidirectional manner, but using receive beams, then the fingerprint dataset also contains receive beam indices, in addition to transmit beam indices. Other combinations of beam indices are possible and do not limit the generality of the disclosed method.

Figure 4:
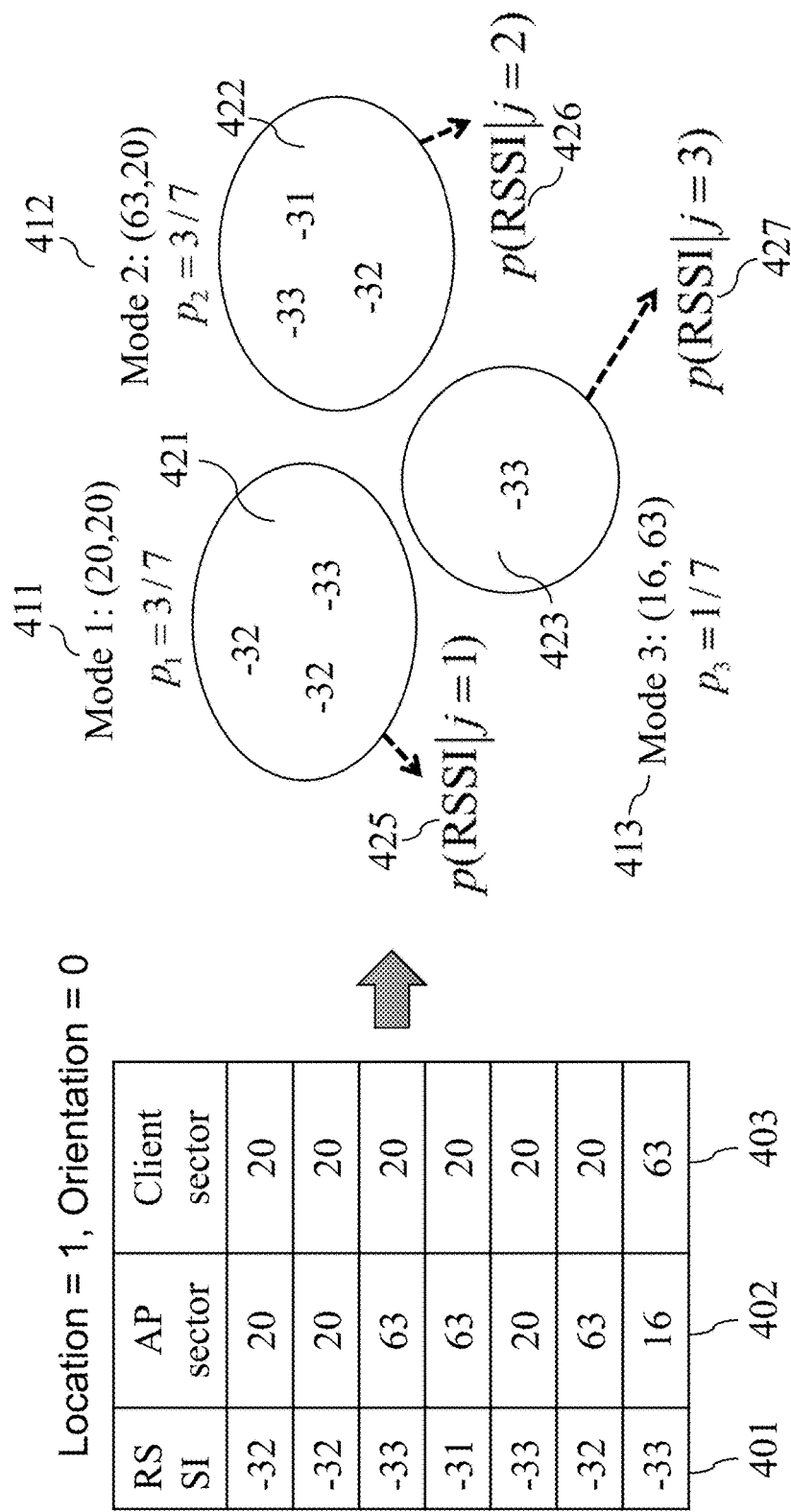
FIG. 4 is a schematic illustrating the fingerprint measurements are summarized by uncovering possible modes that may have generated them, in particular, to give an intuition, a tabulated measurements recorded between a client at some location and orientation, and an access points, according to some embodiments of the present disclosure.

FIG. 4 is a schematic illustrating the fingerprint measurements are summarized by uncovering possible modes that may have generated them, in particular, to give an intuition, a tabulated measurements recorded between a client at some location and orientation, and an access points, according to some embodiments of the present disclosure. For example, as can be seen, N=7 measurements have been recorded, each corresponding to one beam training, and comprising of RSSI value 401 and transmit beam indices of the AP 402 and client 403. The fingerprint measurements are summarized by counting different number of pairs of beam indices such that each distinct pair is associated with one mode. Referring to FIG. 4, there are 3 distinct pairs of beam indices: (20, 20), (63, 20) and (16, 63). They are, respectively, associated with Mode 1 411, Mode 2 412 and Mode 3 413. In addition, the probability of each mode is determined from the relative frequency of occurrence of each beam pair, such that since the pair (20, 20) appears in 3 out of 7 rows in the table, the corresponding mode probability is 3=7. Similarly, the probabilities Mode 2 and Mode 3 are, respectively, 3=7 and 1=7.

Formally, we summarize the measurement record $\mathcal{D}_{l,o,k}$ by clustering it into $J_{l,o,k}$ modes. Each mode is represented with a distinct pair $(b_j^{(AP)}, b_j^{(C)})$, $j=1, \ldots, J_{l,o,k}$. The mode probability $p_j$ is estimated as the relative frequency of occurrence of the beam pair representing mode j over the record of N measurements, $$p_j = \frac{1}{N} \sum_{n=1}^{N} \mathbb{1}(b_j^{(AP)}, b_n^{(AP)}) \mathbb{1}(b_j^{(C)}, b_n^{(C)}), \quad \text{(Eq. 3)}$$

where $\mathbb{1}(a,b)=1$, if a=b, and zero, otherwise.

The RSS levels measured for the same beam pair, i.e., mode, vary and thus each mode j is associated with a set of measured RSS levels $\mathcal{Z}_j$. This set is used to estimate mode probability distribution of RSS levels p(z|j). Referring to FIG. 4 for an illustration, the RSSI values corresponding to each beam pair seen in the data are extracted and associated with the corresponding mode. As such, the RSSI values −32, −32 and −33 are measured over links defined by the beam pair (20,20). Consequently, those values 421 are generated by Mode 1. Similarly, the RSSI measurements 422, 423, recorded over links established over other two beam pairs in this example are associated with, respectively, Mode 2 and Mode 3. The RSSI values associated with some mode are treated as RSSI samples generated from a probability distribution of RSSI values given the mode index. That means that the RSSI value 421 associated with Mode 1 411 are samples from a probability distribution 425 that generates RSSI values in Mode 1. Similarly, RSSI values associated with Mode 2 and Mode 3 are samples from the corresponding distributions 426, 427.

We use two different approaches to estimate p(z|j) from $\mathcal{Z}_j$. In the first approach, p(z|j) is assumed Gaussian distributed, with mean and variance directly computed from Zj such that $$p(z|j) = \mathcal{N}(z; \mu_j, \sigma_j^2), \quad \text{(Eq. 4)}$$

where with mean $\mu_j$ and variance $\sigma_j^2$ are directly computed from $\mathcal{Z}_j$.

In the second approach, the RSS level z is treated as a discrete random variable because commercial chipsets commonly measure it with a coarse quantization step, such as 1 dBm. Hence, p(z|j) is the probability mass function directly estimated from the relative frequency of occurrence of RSS levels z in Zj. Due to silent fluctuations in mmWave channel and coarse quantization of RSS levels, it is not uncommon to observe previously unseen RSS levels over the link defining mode j that are thus not present in Zj. Therefore, p(z|j) is estimated by accounting for that possibility such that $$p(z|j) = \frac{1 + \sum_{\tilde{z} \in \mathcal{Z}_j} \mathbb{1}(\tilde{z}, z)}{|\mathcal{Z}_j| + m_j + 1}, \quad \text{if } z \in \mathcal{Z}_j, \quad \text{(Eq. 5)}$$

and $$p(z|j) = \frac{1}{|\mathcal{Z}_j| + m_j + 1} \quad \text{if } z \notin \mathcal{Z}_j, \quad \text{(Eq. 6)}$$

where $m_j$ denotes the number of different RSS levels in $\mathcal{Z}_j$, i.e., the alphabet size of the RSS levels. The adjustment of classical expressions for relative frequency of occurrence in (5) and (6) is motivated by the fact some RSS levels may not be well-represented in $\mathcal{Z}_j$, i.e., their number of occurrences is relatively small that the maximum likelihood (ML) estimate for the corresponding probability needs to be smoothed. In addition, a previously "unseen" RSS level may be measured in the online stage and thus we account for that situation by extending the RSS alphabet by one more element, corresponding to "unseen" RSS levels in the fingerprinting stage. The prior probability of occurrence of each element from such an alphabet is modelled as Dirichlet distribution with all hyper-parameters equal to one. The posterior probability of occurrence upon observing measurements from $\mathcal{Z}_j$ is evaluated according to (5) and (6), and often referred to as Laplace smoothing.

Overall, the fingerprint measurements $\mathcal{D}_{l,o,k}$ recorded at location l, with orientation o of the client device and corresponding to mmWave link with the AP k, is represented with the set of modes $S_{l,o,k}$, $$S_{l,o,k} = \{p_j, b_j^{(AP)}, b_j^{(C)}, p(z|j)\}_{j=1}^{J_{l,o,k}}, \quad \text{(Eq. 7)}$$

Figure 5:
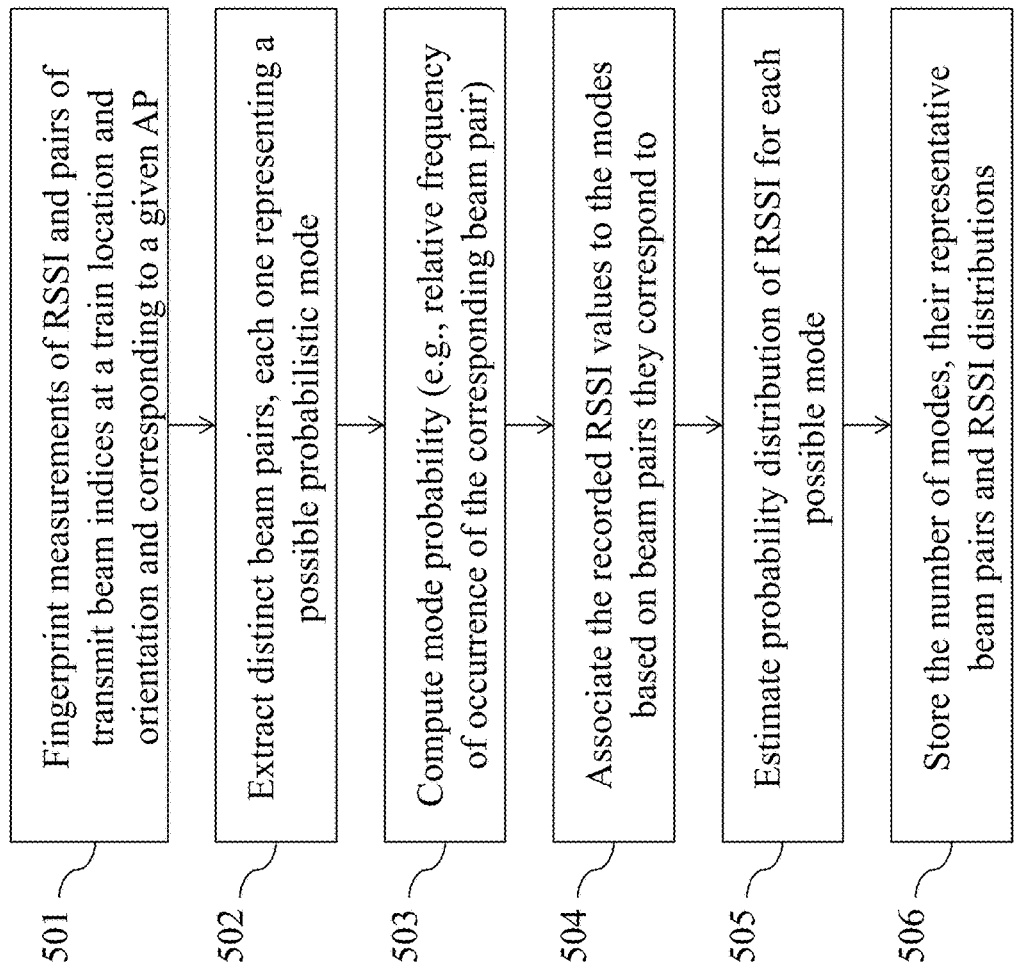
FIG. 5 is a block diagram illustrating a method used to summarize fingerprint measurements, according to some embodiments of the present disclosure.

FIG. 5 is a block diagram illustrating a method used to summarize fingerprint measurements, according to some embodiments of the present disclosure. For example, the input 501 is the collection of all raw measurements collected at a given location and orientation of the client, and correspond to mmWave links established with a given AP over some time period. First, distinct beam pairs from the raw measurements are extracted 502 and each one represents one possible mode. Then, mode probability is estimated 503, for example from the relative frequency of occurrence of the corresponding beam pair in the raw data. The recorded RSSI values are associated with corresponding modes 504 such that an RSSI value is associated with a mode represented by the beam pair of the link over which such RSSI was measured. The probability distribution of RSSI given a mode is estimated 505 by one of the methods described above, i.e., using (4) or (5) or their combination. Finally, the number of modes, their representative beam pairs and RSSI distributions $S_{l,o;k}$ are stored 506 in the memory.

Analogously to (2), all mmWave link measurements taken at location 1 and orientation o of the client devices are summarized as $$S_{l,o} = \cup_{k=1}^{K} S_{l,o,k}, \quad \text{(Eq. 8)}$$

Overall, the fingerprint database thus stores $$S = \cup_{l,o} S_{l,o} \quad \text{(Eq. 9)}$$

Localization Stage

A client device is at unknown location and orientation in the environment and performs a cycle of beam alignments with all K APs sequentially before stablishing a mmWave communication link with one of them. Without loss of generality, we assume the client performs I cycles of beam alignments with the APs. The measurements collected from AP k are represented as a set $$\mathcal{M}_k = \{(z_i, b_i^{(AP)}, b_i^{(C)})_{i=1}^{I}\}, \quad \text{(Eq. 10)}$$

FIG. 6A is a schematic illustrating measurements corresponding to one access point, in a table which has I=3 rows, one row for each beam training cycle and whose columns represent RSSI values, transmit beam index for the considered AP and the transmit beam index for the client, according to some embodiments of the present disclosure. For example, FIG. 6 represents measurements, corresponding to one access point, in a table 600 which has I=3 rows, one row for each beam training cycle and whose columns represent RSSI values 601, transmit beam index for the considered AP 602 and the transmit beam index for the client 603. The client is at unknown location and has an unknown orientation 605 and we describe here a method for estimating the unknown location and orientation based on fingerprint database.

The collection of measurements from all APs is $$\mathcal{Z} = \cup_{k=1}^{K} \mathcal{Z}_k, \quad \text{(Eq. 11)}$$

In other words, the device records measurements of the type illustrated in FIG. 6 corresponding to mmWave links toward each of the access points present in the environment and used to collect the fingerprint database.

We first consider the problem of detecting location l and orientation o represented in the fingerprint dataset, based on measurements M and fingerprint data S. This is done by evaluating posterior distribution of (l; o) given measured and training data, which is using Bayes' rule expressed as $$p(l,o|\mathcal{Z},S) \propto p(\mathcal{Z}|l,o,S) p(l,o), \quad (\text{Eq. 12})$$

where l=1; ... ; L, o=1; ... ; O. The prior distribution of the client p(l, o) is assumed uniform over the space of possible (l, o). We note that in a device tracking problem, p(l, o) encodes prior information of client's position based on previous position estimate and odometry measurements. Since the set of location-orientation pairs (l, o) is finite, the normalization constant in (12) is not explicitly computed.

Assuming independent measurements across APs and time, the likelihood term from (12) is given by $$p(\mathcal{M}|l,o,S) = p(\mathcal{M}|S_{l,o}) = \prod_{k=1}^{K} p(\mathcal{M}_k|S_{l,o,k}) \quad (\text{Eq. 13})$$
$$= \prod_{k=1}^{K} \prod_{i=1}^{I} p(z_i, b_i^{(AP)}, b_i^{(C)} | S_{l,o,k}),$$

The conditional probability of a measurement triplet in (13) is evaluated assuming independence of the RSS level from the beam indices, as well as the independence of the beam indices, $$p(z_i, b_i^{(AP)}, b_i^{(C)} | S_{l,o,k}) = \sum_{j=1}^{J_{l,o,k}} p_j p(z_i|j) p(b_i^{(AP)} | b_j^{(AP)}) p(b_i^{(C)} | b_j^{(C)}), \quad (\text{Eq. 14})$$

where $p_j$, $b_j^{(AP)}$, $b_j^{(C)}$ and $p(z|j)$ are, respectively, the probability, AP's beam index, client's beam index and RSS distribution representing mode j of $S_{l,o,k}$ from (7).

We consider two approaches in specifying the conditional probabilities $p(b_i^{(AP)}|b_j^{(AP)})$ and $p(b_i^{(C)}|b_j^{(C)})$. Noting that the functional form of those distributions is the same irrespective of the device type, AP or client, we omit the superscript and denote with $p(b_i|b_j)$ the conditional probability that beam alignment procedure suggests beam index bi for transmission when the device is in the mode represented by beam index bj. In a hard approach, $$p(b_i|b_j) = \mathbb{1}(b_i, b_j), \quad (\text{Eq. 15})$$

More specifically, this approach excludes the possibility that the suggested beam index is different from the one representing a mode. In other words, if a client and AP negotiate a pair of beam indices that is not present in the fingerprint dataset at a certain location and orientation, the model (15) assigns zero posterior probability that the client is at that particular location and orientation. This approach is justified when the beam patterns corresponding to beam indices are orthogonal, or sufficiently large number of measurements at each location, orientation (l, o) is recorded. However, the beam patterns of the COTS mmWave WiFi routers are considerably deviating from the theoretical ones, let alone orthogonal, as illustrated in FIG. 2. As a result, a link between AP and client over a certain channel path can often be established with more than one possible pair of beam indices.

For example, assume AP and client communicate over $(b_1^{(AP)}, b^{(C)})$ and $(b_2^{(AP)}, b^{(C)})$ equally well, i.e., with the same RSS level, and that the beam patterns corresponding to $b_1^{(AP)}$ and $b_2^{(AP)}$ are quite similar, which is not uncommon in COTS devices. Thus, if $(b_1^{(AP)}, b^{(C)})$ is present in the fingerprint dataset and $(b_2^{(AP)}, b^{(C)})$ is measured in the localization stage at the same location and orientation (l, o), the hard model (15) would assign zero probability that the client is at (l, o). To avoid such an issue, a softer approach in modeling $p(b_i|b_j)$ is needed.

Since the beam patterns of COTS devices can be measured and are available, we model the conditional beam probability $p(b_i|b_j)$ with a cross-correlation between the corresponding beam patterns' magnitudes, $$p(b_i|b_j) = \frac{b_i^T b_j}{\sum_{p=1}^{P} b_p^T b_j}, \quad i=1,\ldots,P, \quad (\text{Eq. 16})$$

where bi and bj are vector representations of the magnitudes of beam patterns indexed with bi and bj, and P is the number of different beam patterns implemented in the used COTS devices. Therefore, the soft beam probability model (16) assigns relatively high probability to all beam patterns that are similar to the one indexed by bj. Back to our simple example, even though the measured beam index $b_1^{(AP)}$ is different from the one recorded in the fingerprint dataset, $b_2^{(AP)}$, the fact their corresponding beam patterns are similar yields relatively high beam probability $$p(b_1^{(AP)} | b_2^{(AP)}),$$

thus giving the algorithm chance to detect that the client is at correct location and orientation (l, o).

Figure 6B:
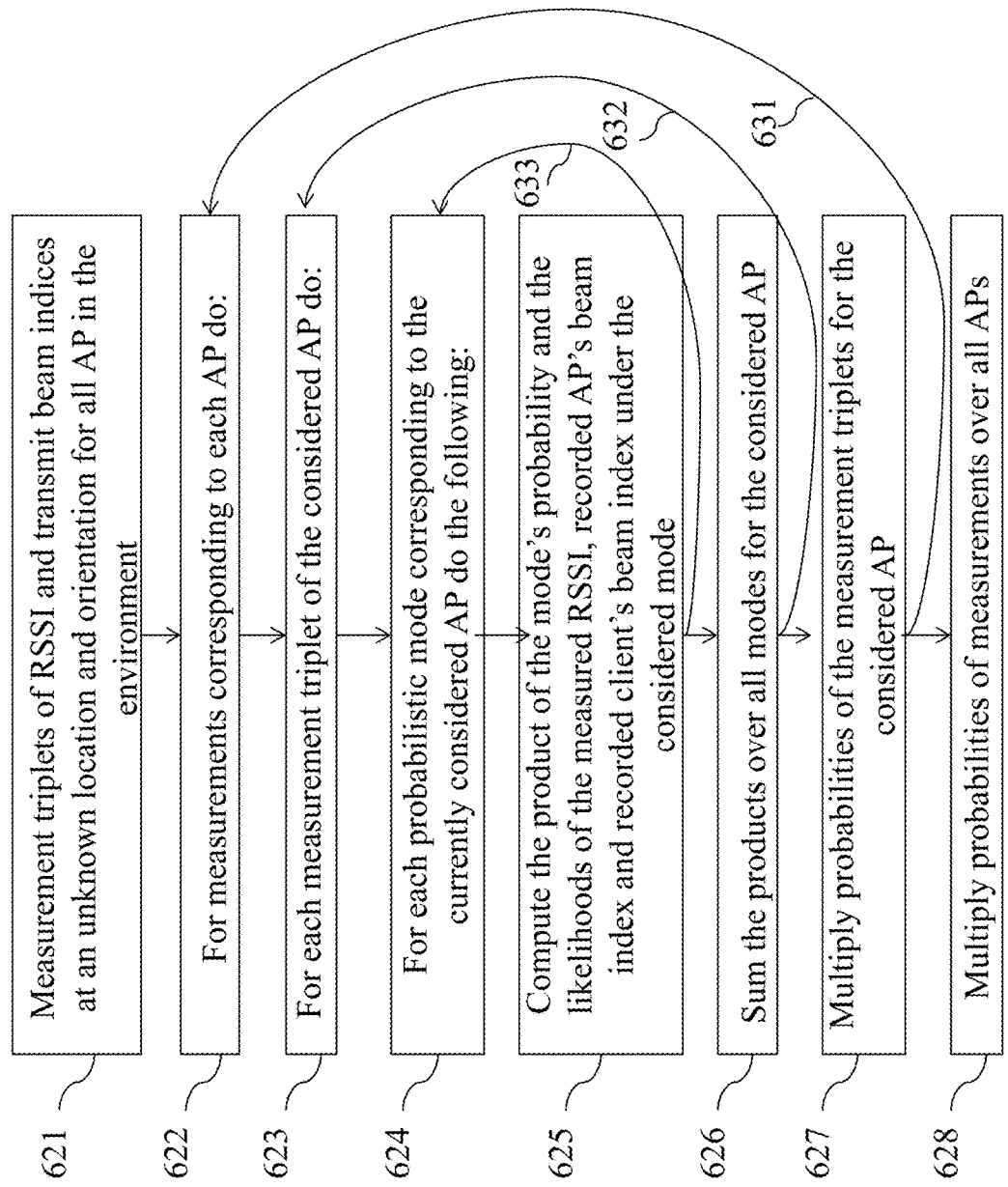
FIG. 6B is a block diagram of illustrating a method computing the likelihood of all measurements at a location-orientation pair (l, o), according to some embodiments of the present disclosure.

FIG. 6B is a block diagram of illustrating a method computing the likelihood of all measurements at a location-orientation pair (l, o), according to some embodiments of the present disclosure. For example, Finally, substituting (16) into (14), and the result into (13) yields the likelihood of test measurements M at a location-orientation pair (l, o). A principle block diagram of for computing the likelihood of all measurements at a location-orientation pair (l, o) is shown in FIG. 6B. The input 621 consists of I measurement triplets for each of K access points. The measurement triplet in this embodiment consists of the measured RSSI value and two beam indices, however, as previously elaborated, there could be more beam indices contained in one measurement instance. Given the input and hypothesized location, orientation pair, loops through measurements of all AP's 622 and then loops through the measured triplets of each considered AP 623. Then, to compute the likelihood of the considered measurement triplet, the method loops through all modes corresponding to the considered AP 624 and computes the likelihood of the measurement triplet under each mode. That is done by computing the product 625 of the mode probability, likelihood of the RSSI, likelihood of the recorded AP's beam index and likelihood of the AP's beam index, where the RSSI and beam indices are from the considered measured triplet. This product is essentially the term under the summation in (14). The mode probability is contained in the stored summary of the fingerprint measurements, the RSSI likelihood is obtained from (??) or the combination of (5) and (6), while the likelihood of either beam index is computed using (15) or (16). The likelihoods of the considered measurement triplets under all different modes are computed by looping 633 through all of modes corresponding to the considered AP and are then summed 626 so as to yield the likelihood of the considered measurement triplet. The method loops 632 through all measurement triplets corresponding to the considered AP, computes their probabilities and multiplies them together 627. Finally, the method loops 631 through all AP's, computes probability of the measurements corresponding to each AP present in the environment and multiplies them 628 to yield the final probability of all measurements at some location-orientation pair. We note that the sum in (14) loops through the modes 633, while the products in (13) loop through APs 631 and measurement triplets 632, respectively.

This likelihood of all measurements for some location-orientation pair is substituted into (12), together with possibly non-uniform prior p(l, o), to eventually yield (after normalization) the posterior distribution of location-orientation pairs. The client's location and orientation are detected based on its measurements M as the location-orientation pair with the largest posterior probability, $$\hat{l}, \hat{o} = \underset{l,o}{\mathrm{argmax}} p(l, o \mid \mathcal{M}, S), \quad \text{(Eq. 17)}$$

Figure 6C:
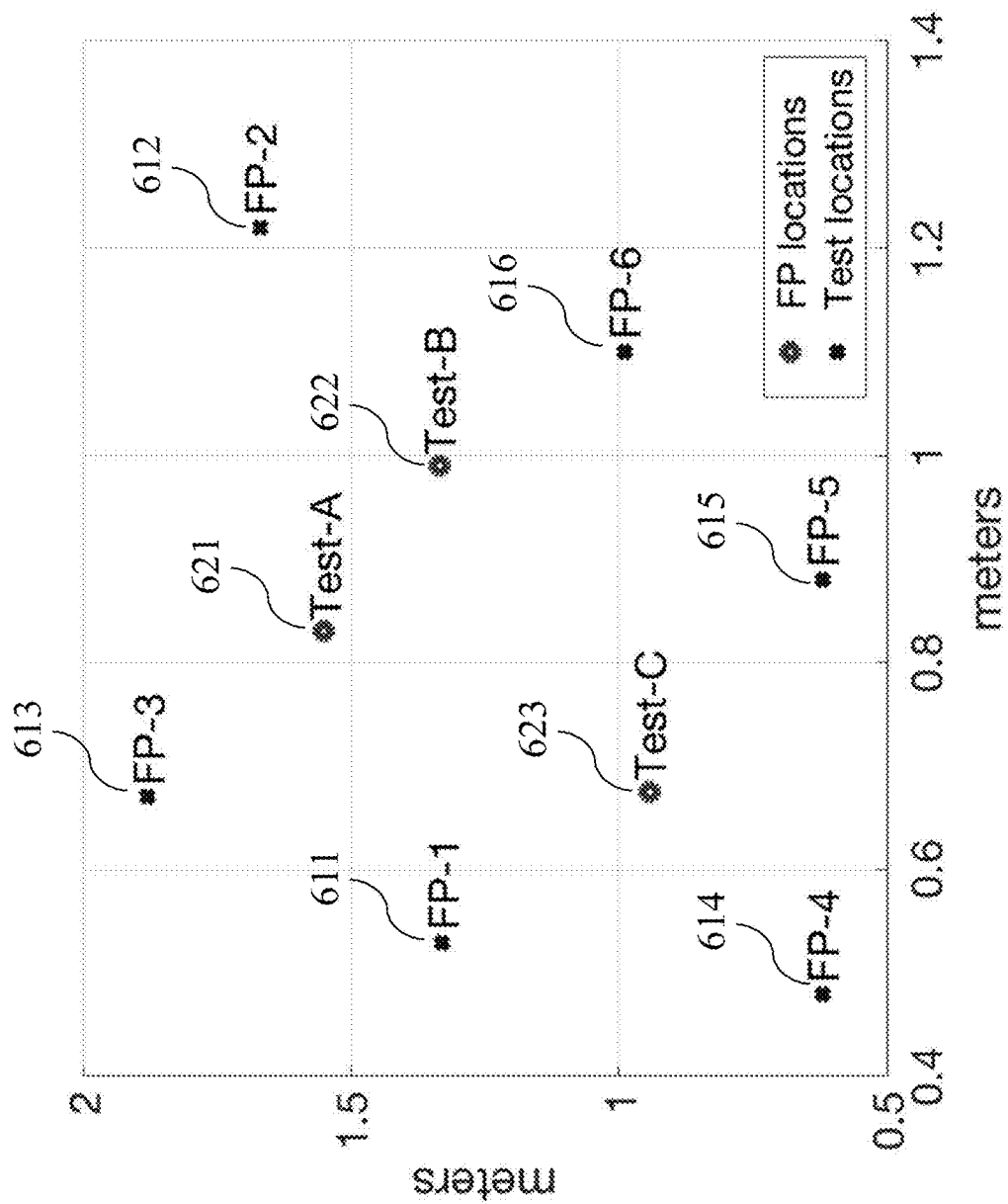
FIG. 6C is a graph diagram of illustrating fingerprint locations represented in the reference coordinate system do not necessarily match with the test locations, i.e., locations (as well as orientations) where a client device may be located, according to some embodiments of the present disclosure.

FIG. 6C is a graph diagram of illustrating fingerprint locations represented in the reference coordinate system do not necessarily match with the test locations, i.e., locations (as well as orientations) where a client device may be located, according to some embodiments of the present disclosure. For example, Commonly, unknown location and orientation of the device are not the ones, at which fingerprint data is collected. As illustrated in FIG. 6C, fingerprint locations 611, 612, 613, 614, 615, 616, represented in the reference coordinate system do not necessarily match with the test locations 621, 622, 623, i.e., locations (as well as orientations) where a client device may be located. Therefore, we estimate the client's location and orientation as centroids of locations and orientations at which fingerprint data is collected, with weights equal to the posterior probabilities (12). More formally, denoting the vector of Cartesian coordinates corresponding to location indexed with l as rl and the orientation indexed with o as $\theta_o$, the unknown client's position and orientation are estimated as $$[\hat{r}\hat{\theta}] = \sum_{l,o} p(l, o \mid \mathcal{M}, S)[r_l \theta_o], \quad \text{(Eq. 18)}$$

When the client's Cartesian coordinates are only of interest, which is often the case, their vector representation is estimated as $$\hat{r} = \sum_{l} p(l \mid \mathcal{M}, S) r_l, \quad \text{(Eq. 19)}$$

Figure 6D:
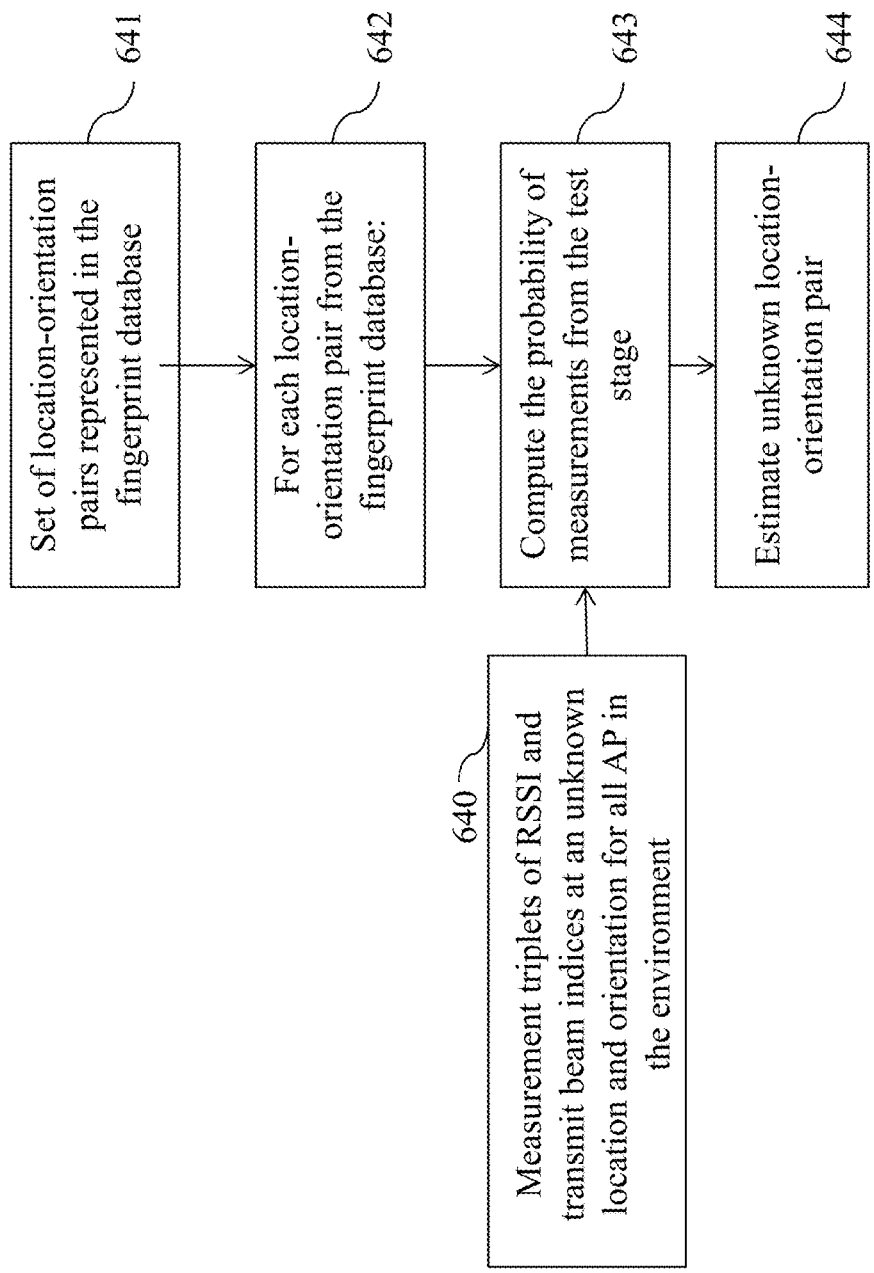
FIG. 6D is a block diagram of illustrating a method for estimating location-orientation pair, according to some embodiments of the present disclosure.

FIG. 6D is a block diagram of illustrating a method for estimating location-orientation pair, according to some embodiments of the present disclosure. For example, A principle block diagram of the method for estimating location-orientation pair is shown in FIG. 6D. The input is the set 641 of all location-orientation pairs from the environment represented in the fingerprint database. The method loops 642 through all location-orientation pairs and for each pair computes 643 the likelihood of the collected measurements 640 at that location-orientation air. The final estimate of the unknown location and orientation of the client is obtained 644 as hard (17) or soft (18) estimate. Alternatively, only unknown location of the client may be necessary, in which case the estimation 644 is done through (19).

Beam SNR Measurements from 802.11ad Devices

To compensate high path loss in high-frequency band such as 60 GHz, IEEE 802.11ad standards use directional antennas to focus their energy in the direction of the receiving node. To search this desired direction, a series of pre-defined beam patterns or sectors are used at the directional antennas to probe the environment. After the sector sweep is finished, the connection can be established by choosing the pair of beam sectors by the two IEEE 802.11ad nodes. Such sector sweep is periodically repeated and the beam sectors are updated to adapt to the environmental changes or device movements. As a result, the beam SNR measurements from multiple beam sectors are inherently available from 802.11ad devices without any overhead. For practical 60-GHz WIFI devices such as commercial access points (APs), a fixed set of varying beam sectors are swept in a pre-defined time order. For instance, the first 60 GHz device that fully implements the IEEE 802.11ad standard, TP-Link Talon AD7200 router with a phased array of 32 antenna elements has 36 pre-defined beam sectors. Due to the antenna housing and calibration, irregular antenna beam patterns are used in the phase array. Two of such irregular antenna beam patterns are shown in FIG. 2. Given the antenna beam patterns, the beam SNR for the m-th beam pattern is defined as $$h_m = \text{Beam } SNR_m = \frac{\sum_{i=1}^{I} \gamma_m(\theta_i) P(\theta_i)}{\sigma^2}, \quad \text{(Eq. 1)}$$

where I is the total number of (LoS/NLoS) paths, $\theta_i$ is the azimuth angle for the i-th path, $P(\theta_i)$ is the signal power at the i-th path, $\gamma_m(\theta_i)$ is the m-th antenna beam pattern gain at the i-th path, and $\sigma^2$ is the noise variance.

Offline Training Dataset

To construct the fingerprinting dataset, we stack all SNR measurements from all beam sectors as a vector, e.g., h=[$h_1$, $h_2$, . . . , $h_M$]$^T$. When multiple APs are used, we combine beam SNR measurements from each AP to form one fingerprinting snapshot, i.e., $\tilde{h}$=[$h_1^T$, $h_2^T$, . . . , $h_P^T$]$\in \mathbb{R}^{MP\times 1}$, where P is the number of APs. For a given location and orientation, R fingerprinting snapshots, $\tilde{h}_1$(l, o), . . . , $\tilde{h}_R$(l, o), are collected to construct the offline training dataset, where l and o are the indices for the location and orientation, respectively.

Figure 7A:
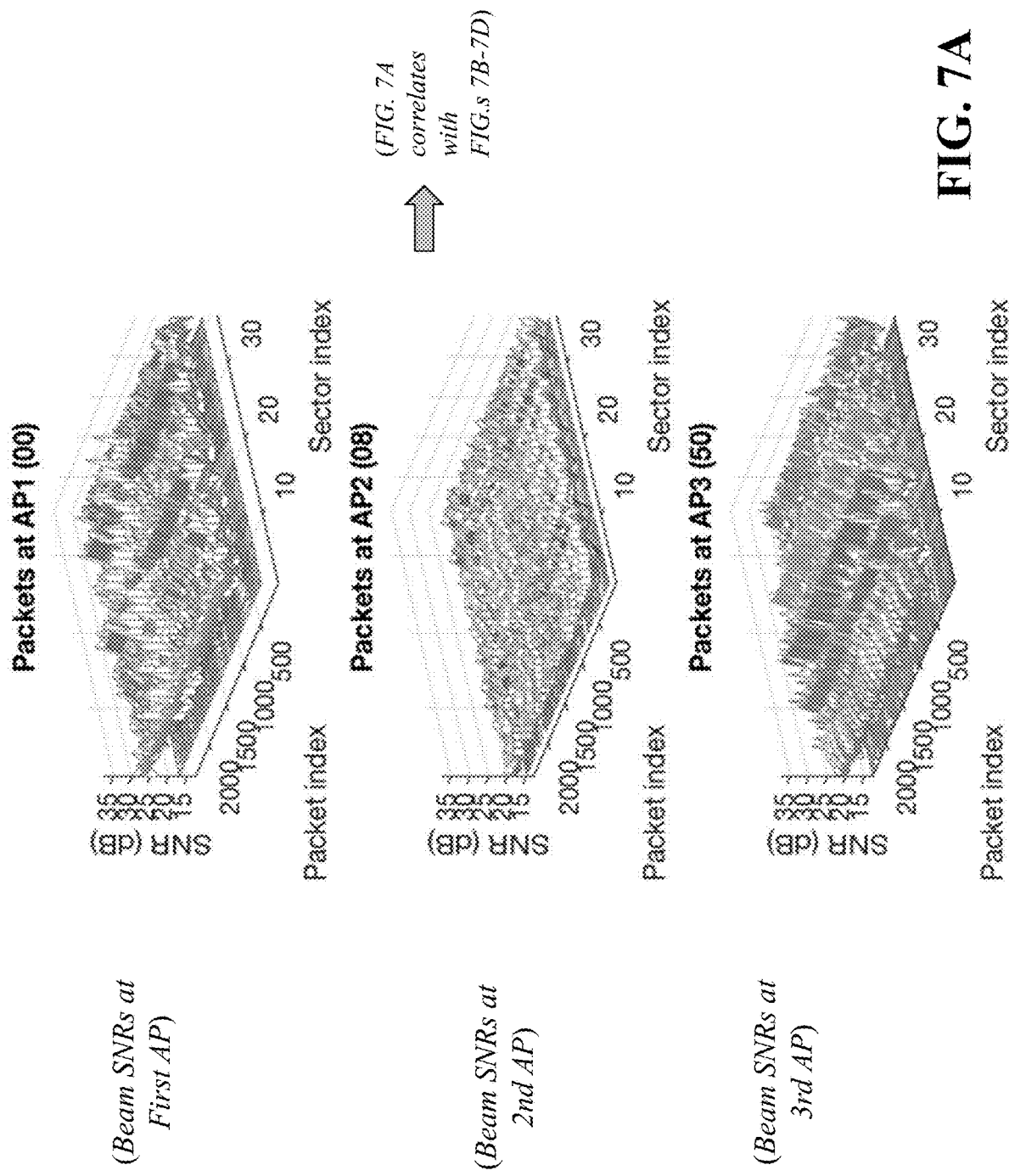
FIG. 7A shows an example of real-world beam SNR measurements at one AP using commercial off-the-shelf 802:11ad device in an office environment, where M=36 beam sectors are swept to measure SNRs, according to some embodiments of the present disclosure.

FIG. 7A shows an example of real-world beam SNR measurements at one AP using commercial off-the-shelf 802:11ad device in an office environment, where M=36 beam sectors are swept to measure SNRs, according to some embodiments of the present disclosure. It is seen that the beam SNR patterns remain stable over time (packet index) with a few fluctuations at some packet indices. The distinct beam SNR pattern is the fingerprinting feature we capture in the training dataset. As noted earlier, beam SNRs are a set of SNR values over 36 probing beams (for example, beams 203 and 204 in FIG. 2), such that for each packet, one AP collects 36 beam SNR values. Further, over time, each AP collects Beam SNRs over multiple packets to construct the training (fingerprinting) dataset.

By collecting many realizations of beam SNR measurements at multiple APs over L locations-of-interests and O orientations, we will have LO sets of MP×R beam SNR measurements in the training dataset.

Figure 7D:
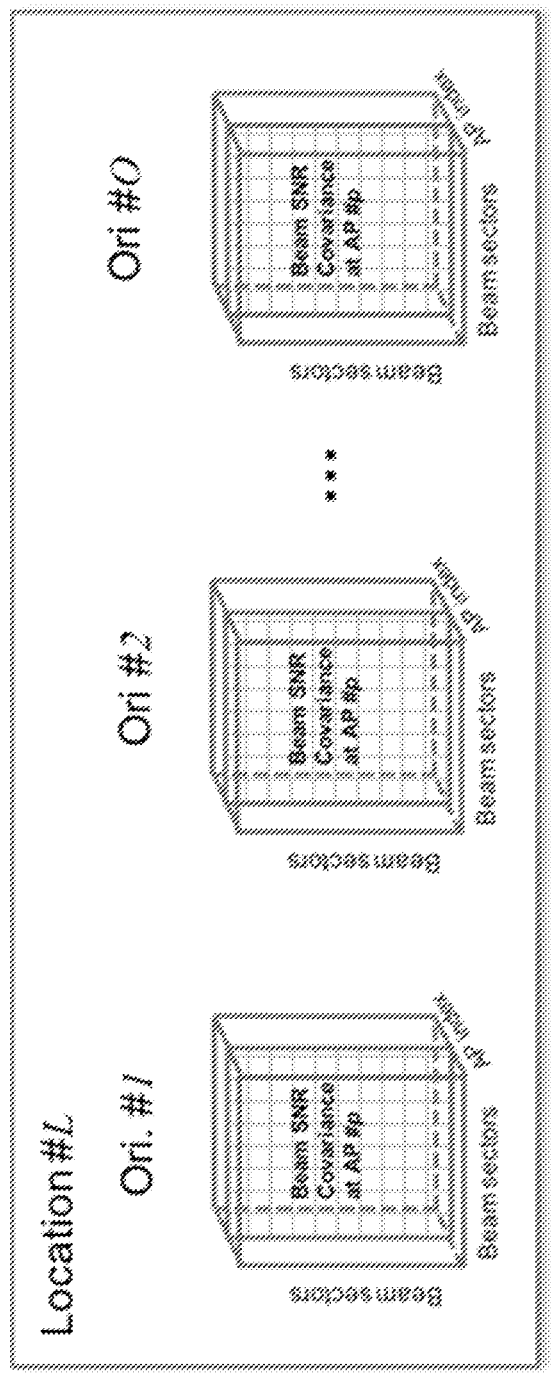

FIGS. 7B-7D are graphs illustrating the training dataset of FIG. 7A, the training dataset is illustrated for each location and orientation of the client, such that all the beams SNRs collected over time at multiple APs are used to construct the training dataset, according to some embodiments of the present disclosure.

Figures 7E, 7F:
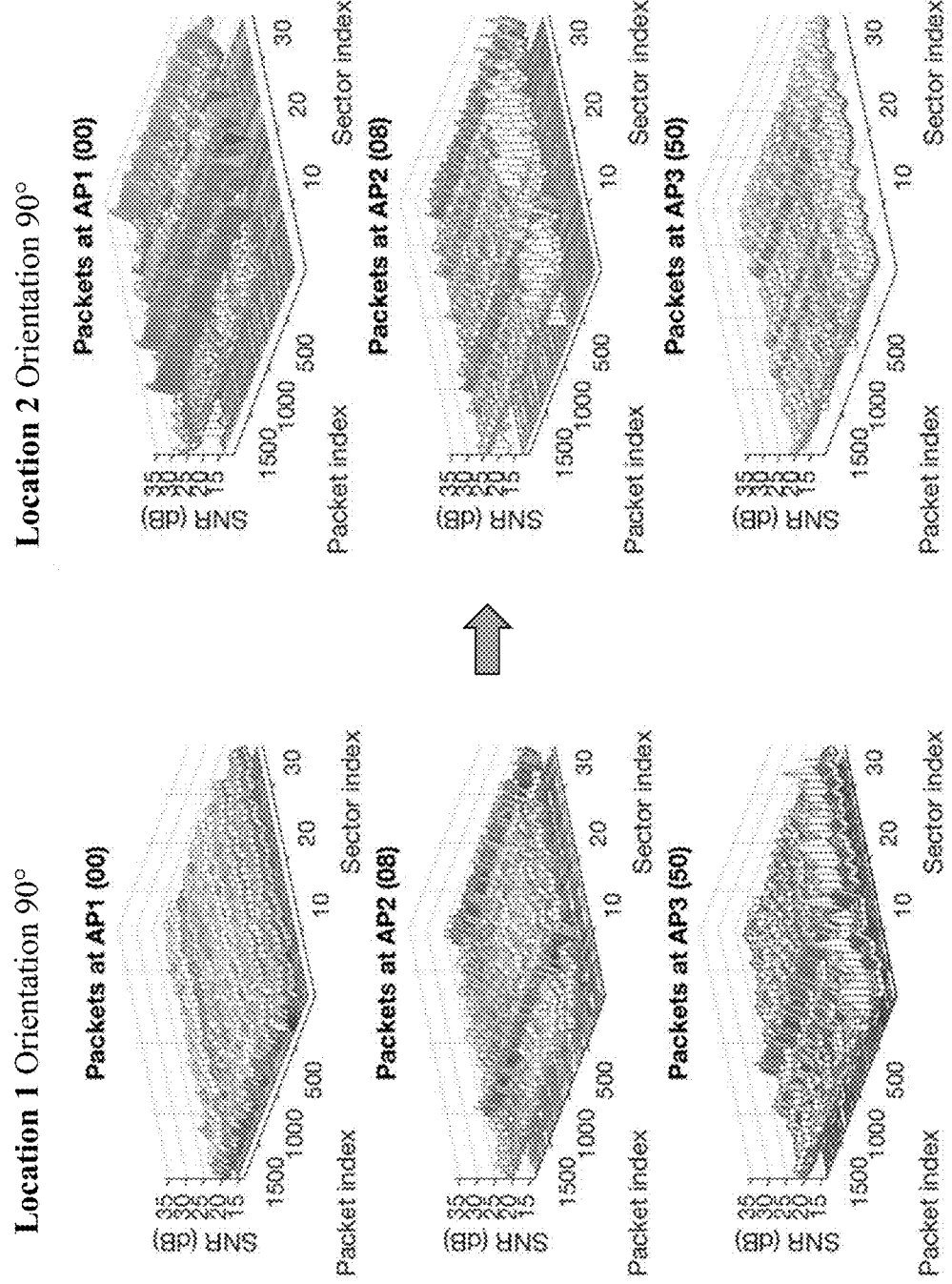
FIG. 7E and FIG. 7F are graphs illustrating that beam SNRs at each AP have strong sensitivity to the user's location, according to some embodiments of the present disclosure.

FIG. 7E and FIG. 7F are graphs illustrating that beam SNRs at each AP have strong sensitivity to the user's location, according to some embodiments of the present disclosure. In other words, beam SNRs can be used as fingerprinting data to register the user's locations. More specifically, FIG. 7E and FIG. 7F show that all 3 APs have very different beam SNR patterns when the user moves from Location 1 to Location 2, while keeping the same orientation.

FIG. 7G and FIG. 7H are graphs illustrating that beam SNRs at each AP have strong sensitivity to the user's orientation, according to some embodiments of the present disclosure. In other words, beam SNRs can be used as fingerprinting data to register the user's orientation as well. More specifically, FIG. 7C shows that all 3 APs have very different beam SNR patterns when the user rotates its orientation from 0° to 90°, while staying at the same location, i.e. each AP shows very different beam SNR patterns when the user rotates its orientation from 0° to 90°, while staying at the same location.

Figures 7I, 7J:
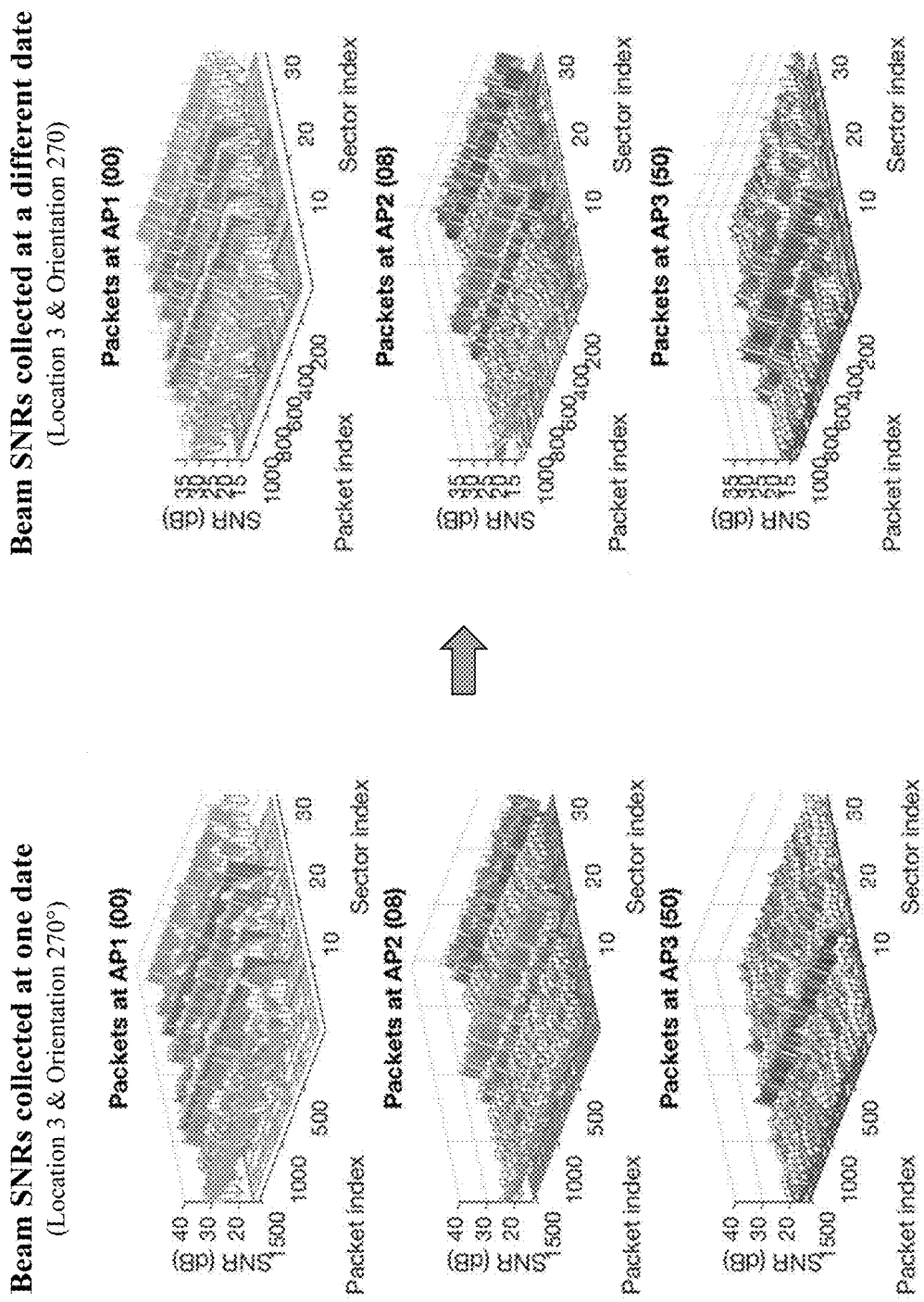
FIG. 7I and FIG. 7J are graphs illustrating that beam SNRs are robust over time and can be repeated when we collect the data at two different dates in regular office hours, according to some embodiments of the present disclosure.

FIG. 7I and FIG. 7J are graphs illustrating that beam SNRs are robust over time and can be repeated when we collect the data at two different dates in regular office hours, according to some embodiments of the present disclosure. In other words, each AP shows almost the same beam SNR patterns even when the two datasets are collected at two different dates.

Localization Algorithms Using Beam SNRs

Figure 8A:
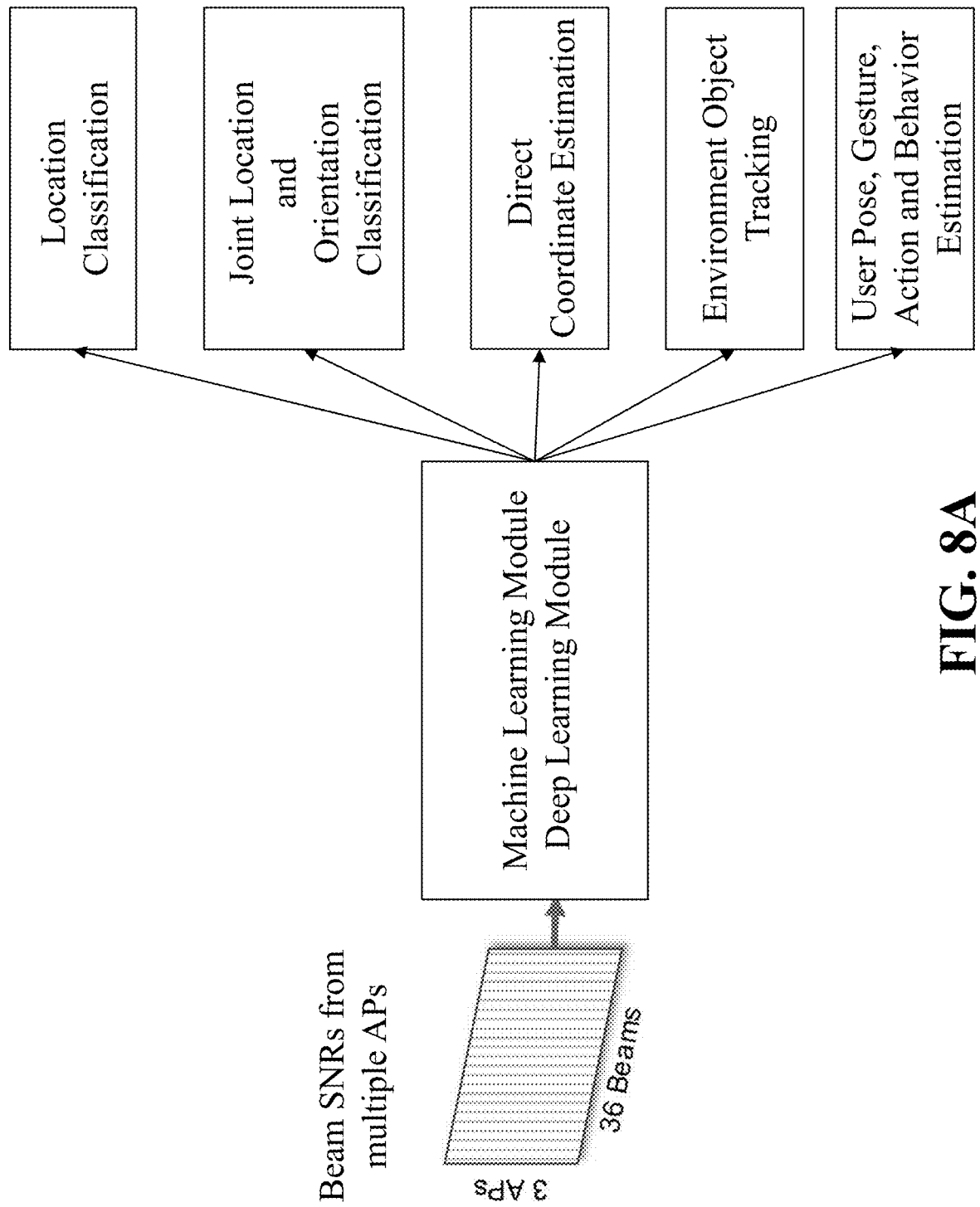
FIG. 8A is a block diagram illustrating that when new fingerprinting measurements from an unknown location are available, the problem of interest is to, with a chosen performance metric, find a best match of the new measurements in the offline training dataset and determine its location and/or orientation, using machine learning methods, according to some embodiments of the present disclosure.

FIG. 8A is a block diagram illustrating that when new fingerprinting measurements from an unknown location are available, the problem of interest is to, with a chosen performance metric, find a best match of the new measurements in the offline training dataset and determine its location and/or orientation, using machine learning methods, including linear/quadratic discriminant analysis (LDA/QDA), support vector machine (SVM), decision tree (DT)), the nearest neighboring-based method, Gaussian process, and deep learning-based methods for classification and coordinate estimation. While some embodiments estimate states of radio devices such as locations and orientations, other embodiments are based on a recognition that mmWave beam signal can be sensitive to states of environment such as physical object locations, door openings, ambient users actions and occupancies such that the present disclosure can estimate those states of environment in a same manner of estimating states of the devices.

Position/Orientation Classification

Figure 8B:
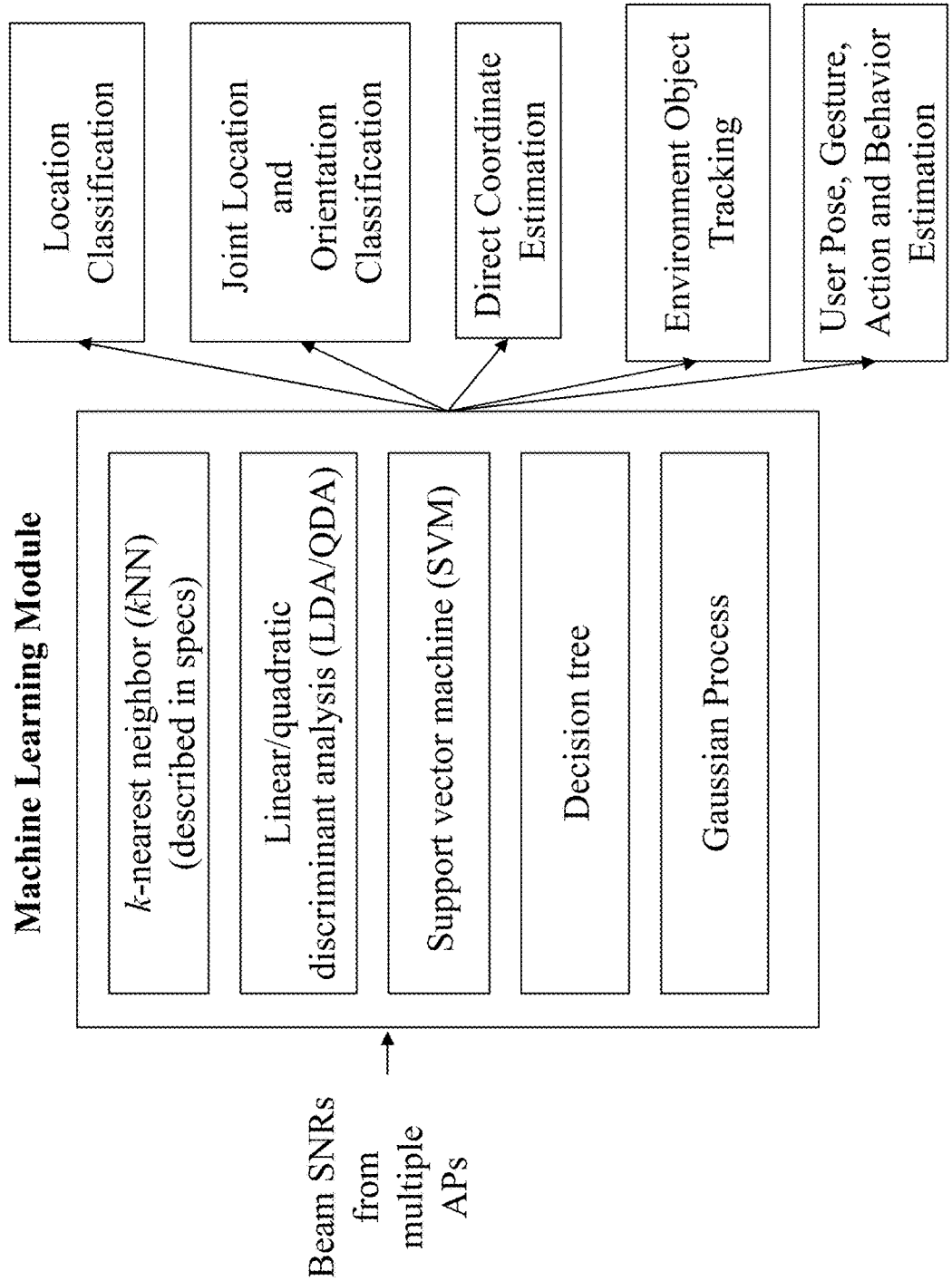
FIG. 8B is a block diagram illustrating an approach to classify new fingerprinting measurements into one of training locations that is the kNN method, according to some embodiments of the present disclosure.

FIG. 8B is a block diagram illustrating an approach to classify new fingerprinting measurements into one of training locations that is the kNN method, according to some embodiments of the present disclosure. For example, the kNN method relies on a metric of distance, e.g., Euclidean distance and Minkowski distance of 'p norms, between the beam SNR measurements. A decision is made by examining the labels on the k nearest neighbors with respect to new fingerprinting measurements and taking a vote. Specifically, we define the distance metric between two beam SNR vectors as follows $$d(h, h') = \sqrt{\frac{1}{M}(h-h')^T W(h-h')}, \quad \text{(Eq. 2)}$$

where W is a diagonal matrix with diagonal elements denoting the importance of corresponding beam sectors. This weighted distance metric can be straightforwardly extended to the case of multiple SNR measurements and multiple APs.

We first train the kNN classification model based on all beam SNR measurements in the training data with both location and orientation labels. Then, for a candidate location and orientation, we collect a batch of Q beam SNR snapshots, $\bar{h}_1, \ldots, \bar{h}_Q$, and compute the batch of all Q test snapshots with a window of Q measurements sliding through the training dataset $$d_t(l, o) = \sqrt{\frac{\sum_{q=1}^{Q}(\bar{h}_{t+q-1}(l,o) - \bar{h}_q)^T W(\bar{h}_{t+q-1}(l,o) - \bar{h}_q)}{MQ}}, \quad \text{(Eq. 3)}$$

where t=1, ..., R−Q+1, l=1, ..., L and o=1, ..., O. From all (R−Q+1)LO computed distances, the k nearest samples are selected and, from their labels of locations and orientations, the most frequently appeared label is picked as the predicted label for the candidate location and orientation. When k=1, the location and orientation are determined by choosing the one giving the smallest distance:

$$(\hat{l}, \hat{o}) = \arg\min_{l,o}\left[\min_{t=1,\ldots,R-Q+1} d_t(l, o)\right], \quad \text{(Eq. 4)}$$

Still referring to FIG. 8B, then only the location is of interest, we can simply repeat the above process by only using the location label from the training dataset. Similarly, one can apply other classification methods to the beam SNR measurements.

Direct Coordinate Estimation by GP

Some embodiments of the present disclosure estimate coordinates of test locations using fingerprinting datasets. An experimented approach included a weighted kNN method which uses a weighted coordinates. Wherein he weight coefficients were computed using the Euclidean distance in the feature space. However, due to multiple orientations at a given location and a limited number of training locations, these embodiments chose to adopt a weighted kNN method directly on the beam SNR measurement space. Specifically, the above classification step obtains the smallest k distances between the new measurement and the training dataset. For each of the k beam SNR measurements in training data, the distance $\{d_i\}_{i=1}^{K}$ is computed as (3). Then the coordinates of test data are estimated as follows $$(\hat{x}, \hat{y}) = \frac{\sum_{i=1}^{k} w_i \times (x_i, y_i)}{\sum_{i=1}^{K} w_i}, \quad \text{(Eq. 5)}$$

where (xi, yi) is the coordinate of training locations with the k smallest distances, and wi is the corresponding weight determined by $w_i=\gamma/d_i+\varepsilon$ is a small positive number to prevent the denominator from zero and is a normalized parameter.

Still referring to FIG. 8B, noted is that the weighted kNN method still relies on the classification results. Instead, by directly formulating the coordinate estimation as a supervised regression problem from the multi-AP beam SNR measurements to two-dimensional (2-D) coordinates, allows for the possibility to directly estimate the coordinate of test locations. Specifically, first is to apply the GP with a choice of kernel function (e.g., exponential and radial-basis function) to labeled fingerprinting data at training locations. A set of hyper-parameters of the chosen kernel is optimized with beam SNR measurement as input and training coordinates as output by maximizing the log marginal-likelihood (ML) with an equally likely prior on all training locations. Then, the direct coordinate estimation is obtained by applying the optimized GP to the new beam SNR measurement.

Direct Coordinate Estimation by Deep Learning

Figure 8C:
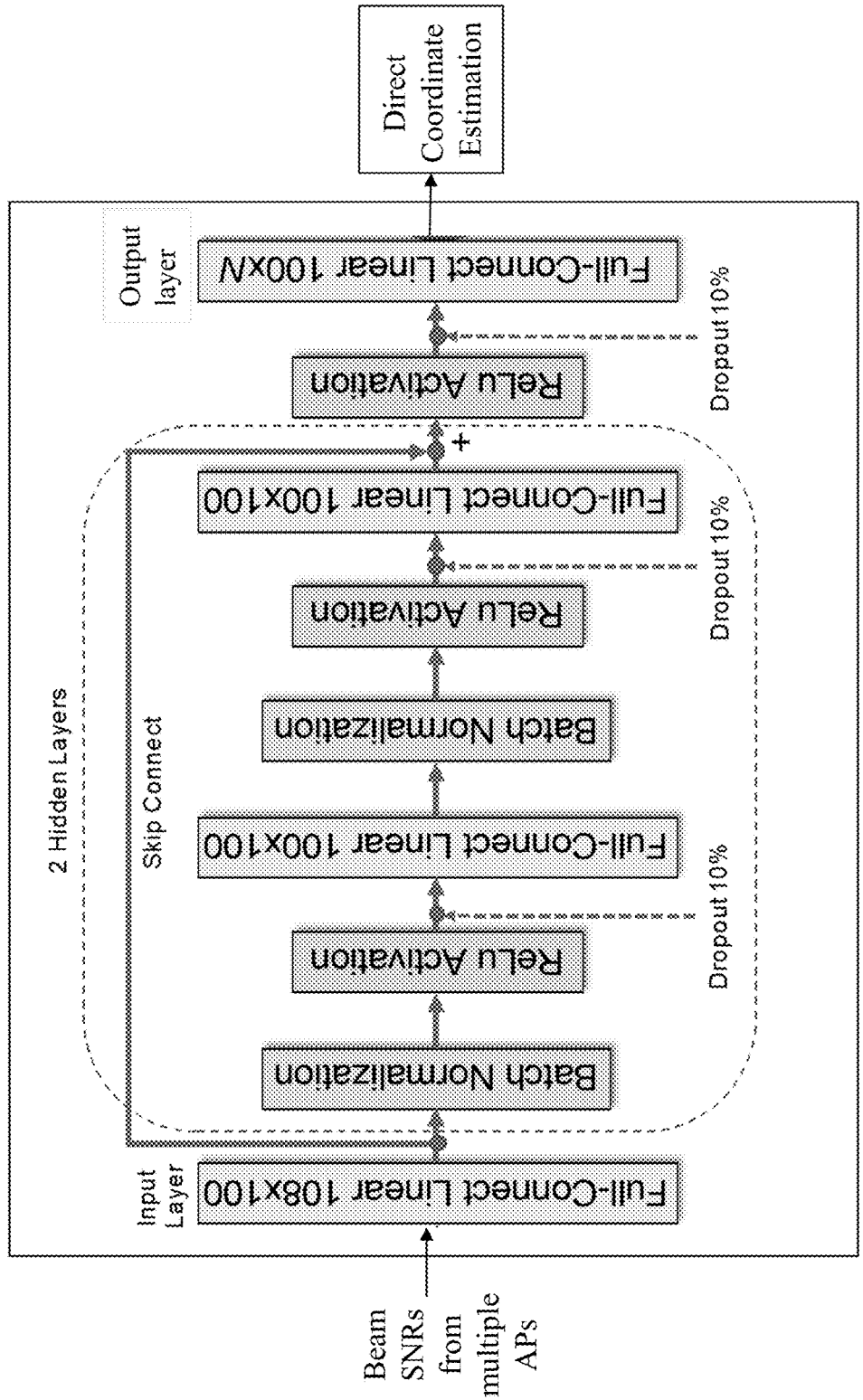
FIG. 8C is a schematic illustrating a DNN architecture for indoor localizations, according to some embodiments of the present disclosure.

FIG. 8C is a schematic illustrating a DNN architecture for indoor localizations, according to some embodiments of the present disclosure. The DNN feeds beam SNRs information measured at the beam training phase of COTS IEEE 802.11ad devices, which searches for the best beam pattern by sweeping multiple predefined beam profiles. When multiple APs exist nearby, makes possible to exploit beam SNRs from all APs to improve the localization accuracy.

When 36 beam sectors are available from three APs, a total of 108 SNR information is fed into the input layer of the DNN, where the input layer first transforms to 100-node dimensions by fully-connected linear layer. The DNN then employs two hidden layers having 100 nodes per layer, consisting of batch normalization layer, rectified linear unit (ReLU) activation layer with 10% dropout, and fully-connected linear layer. The dropout is a technique to prevent over-fitting for improved generalizability. Additionally, considered is a skip connect jumping from the input of hidden layers to the output of hidden layers in order to learn residual gradient for improved training stability. A fully-connected linear layer following an activation layer with dropout produces the output of the DNN.

Still referring to FIG. 8C, the dimensionality of the output layer depends on the localization scenarios. Specifically, three localization scenarios are investigated; i) location identification, ii) joint location & orientation identification, and iii) location coordinate estimation. For the first two scenarios, the DNN is trained to minimize softmax cross-entropy loss to predict identification from multiple predefined location landmarks. For location identification, the dimension of output nodes is L while it is L×O for joint location and orientation identification. Whereas for the last scenario, the DNN produces estimated (x, y) coordinate value by training in the sense of mean-square error (MSE) loss. For this case, the number of output nodes is just two, representing (x, y).

For example, a Chainer library is used for the DNN implementation. DNN training was performed by adaptive momentum (Adam) stochastic gradient descent method with a learning rate of 0.001, and a mini-batch size of 100. The maximum number of epochs is 500 while early stopping with a patience of 20 was taken place.

Figure 9:
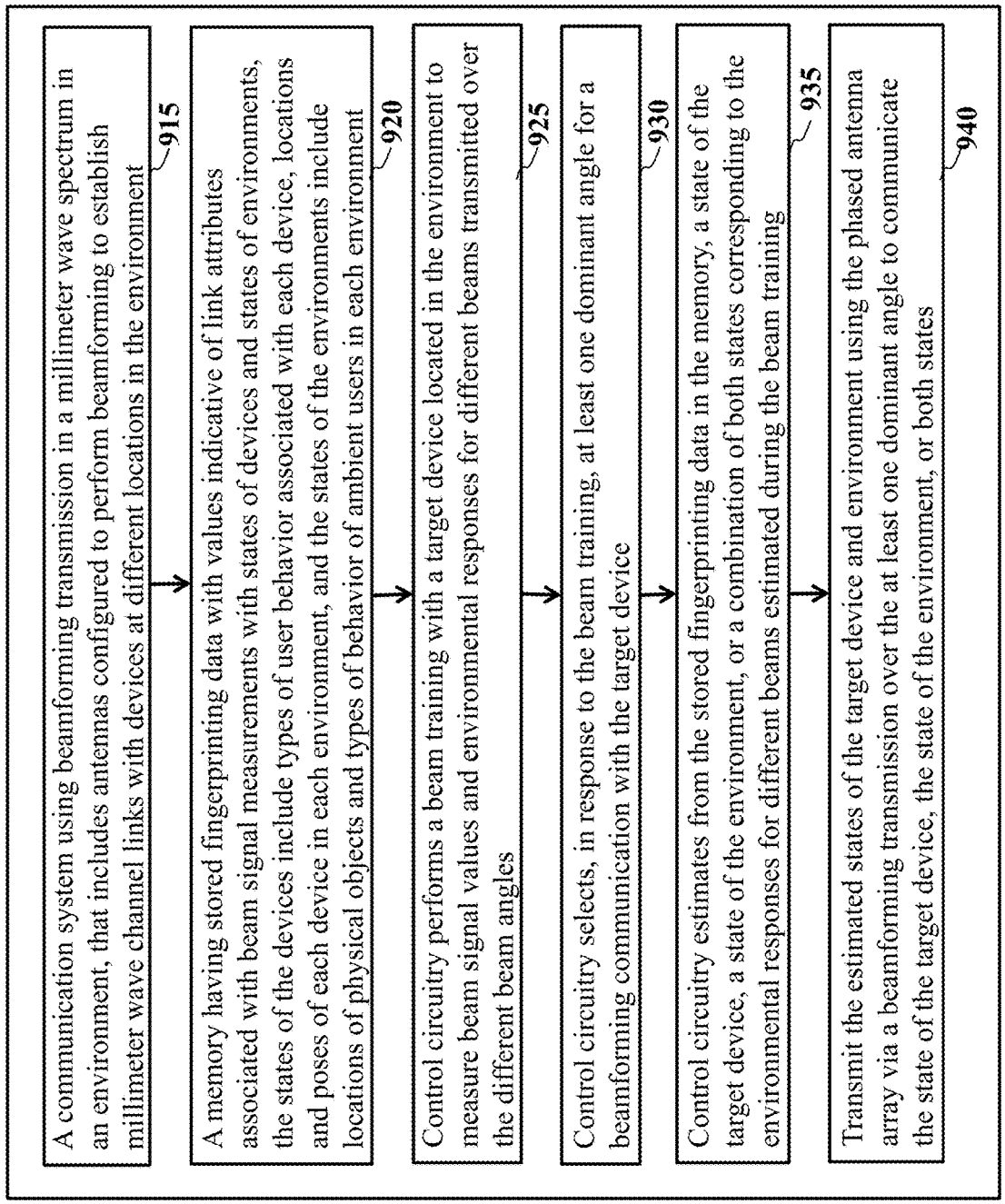
FIG. 9 is a block diagram illustrating another system, according to an embodiment of the present disclosure.

FIG. 9 is a block diagram of a method, according to an embodiment of the present disclosure.

Step 915 of FIG. 9 includes a communication system using beamforming transmission in a millimeter wave spectrum in an environment, that includes antennas configured to perform beamforming to establish millimeter wave channel links with devices at different locations in the environment.

Step 920 of FIG. 9 includes a memory connected to the antennas, having stored fingerprinting data. The stored fingerprinting data include values indicative of link attributes associated with beam signal measurements with states of devices and states of environments. The states of the devices include types of user behavior associated with each device, locations and poses of each device in each environment. The states of the environments include locations of physical objects and types of behavior of ambient users in each environment.

Step 925 of FIG. 9 includes the control circuitry communicatively connected with the antennas and the memory, is configured to perform a beam training with a target device located in the environment to measure beam signal values and environmental responses for different beams transmitted over the different beam angles.

Step 930 of FIG. 9 includes the control circuitry selects, in response to the beam training, at least one dominant angle for a beamforming communication with the target device.

Step 935 of FIG. 9 includes the control circuitry estimates from the stored fingerprinting data in the memory, a state of the target device, a state of the environment, or a combination of both states corresponding to the environmental responses for different beams estimated during the beam training Step 940 of FIG. 9 includes the control circuitry transmits the estimated states of the target device and environment using the antennas via a beamforming transmission over the at least one dominant angle to communicate the state of the target device, the state of the environment, or both states.

Features

According to another embodiment of the present disclosure, a using beamforming transmission in a mmWave spectrum in an environment, that includes a phased antenna array configured to perform beamforming to establish millimeter wave channel links with devices at different locations in the environment. The communication system including a memory connected to the phased antenna array, having stored data. The stored data include values indicative of SNR measurements of a set of beams emitted at different beam angles by the phased antenna array and measured at a set of locations, that provide for a mapping between different combinations of SNR values of the set of beams and the set of locations. Such that a location from the set of locations is mapped to a unique combination of the SNR values of the set of beams. Control circuitry communicatively connected with the phased antenna array and the memory, configured to perform a beam training with a target device located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device using the phased antenna array via a beamforming transmission over the at least one dominant angle. Wherein the following aspects either each aspect can modify the above embodiment to create a modified embodiment, or two or more aspects or any combination of multiple aspects can create one or more modified embodiments of the above embodiment.

According to aspects of the present disclosure, wherein the phased antenna array includes antenna beam sectors, such that the phased antenna array iteratively sweeps the environment, sequentially, to establish at least one millimeter wave link with the devices and the target device in the environment.

Other aspect can include the stored data include each location from the set of locations that is mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

Another aspect can be that stored data include values indicative of link attributes including one of beam RSSI measurements, beam CSI measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams. Wherein, and aspect may include the link attributes further includes one or a combination of RSSI measurements or CSI measurements.

An aspect may include the control circuitry is configured to control a mechanical positioner to mechanically adjust an orientation of the phased antenna array and/or control a beam steering circuitry to steer the millimeter wave signals towards the location of the target device.

Another aspect can include each device of the devices includes a phased antenna array having antenna beam sectors that sweep the environment, such that some devices of the devices are COTS devices.

Also, another aspect can be that the target device is associated with an electronic device capable of establishing a link with the phased array of antennas, such that the target device is further associated with one of a robot, a human, a computer, a computer like device or an electronic device adaptable to a According to another embodiment of the present disclosure, a electronic system using beamforming transmission in a millimeter wave spectrum is configured to communicate with devices and a target device in an environment, that includes antennas configured to transmit and receive millimeter wave signals. The electronic system including a memory connected to the antennas, having stored data. The stored data include values indicative of SNR measurements of a set of beams emitted at different beam angles by the antennas and measured at a set of locations, that provide for a mapping between different combinations of SNR values of the set of beams and the set of locations. Such that a location from the set of locations is mapped to a unique combination of the SNR values of the set of beams. Control circuitry connected with the antennas and the memory, is configured to perform a beam training with the target device located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device using the antennas via a beamforming transmission over the at least one dominant angle. Wherein the following aspects either each aspect can modify the above embodiment to create a modified embodiment, or two or more aspects or any combination of multiple aspects can create one or more modified embodiments of the above embodiment.

An aspect can include that the antennas are arranged in a phased antenna array, and configured to transmit and receive millimeter wave signals with the devices at different locations in the environment. Wherein an aspect can further comprise a mechanical positioner coupled to the phased antenna array. The control circuitry can be configured to mechanically adjust a position of at least one antenna in the phased antenna array to direct the millimeter wave signals towards a location of the target device by controlling the mechanical positioner. Another aspect can further comprise beam steering circuitry coupled to the phased antenna array. The control circuitry can be configured to steer the millimeter wave signals towards the location of the target device by controlling the beam steering circuitry. Also, steer the millimeter wave signals towards the location of the target device after the mechanical positioner mechanically adjusts the position of the at least one antenna in the phased antenna.

According to another embodiment of the present disclosure, a communication system using beamforming transmission in a millimeter wave spectrum in an environment, that includes antennas configured to perform beamforming to establish millimeter wave channel links with devices at different locations in the environment. The communication system including a memory connected to the antennas, having stored fingerprinting data. The stored fingerprinting data include values indicative of link attributes associated with beam signal measurements with states of devices and states of environments. The states of the devices include types of user behavior associated with each device, locations and poses of each device in each environment. The states of the environments include locations of physical objects and types of behavior of ambient users in each environment. Control circuitry communicatively connected with the antennas and the memory, is configured to perform a beam training with a target device located in the environment to measure beam signal values and environmental responses for different beams transmitted over the different beam angles. Select, in response to the beam training, at least one dominant angle for a beamforming communication with the target device. Estimate from the stored fingerprinting data in the memory, a state of the target device, a state of the environment, or a combination of both states corresponding to the environmental responses for different beams estimated during the beam training Transmit the estimated states of the target device and environment using the antennas via a beamforming transmission over the at least one dominant angle to communicate the state of the target device, the state of the environment, or both states. Wherein the following aspects either each aspect can modify the above embodiment to create a modified embodiment, or two or more aspects or any combination of multiple aspects can create one or more modified embodiments of the above embodiment.

An aspect can include the link attributes includes one or a combination of, beam SNR measurements, beam received signal strength indicator measurements, beam CSI measurements, beam patterns or beam sequencing, and wherein each device is associated with a user, such that the user is one of a robot, a human, a computer, a computer like device or an electronic device adaptable to a human.

According to another embodiment of the present disclosure, a method using a communication system having beamforming transmission in a millimeter wave spectrum in an environment, that includes antennas configured to perform beamforming to establish millimeter wave channel links with devices at different locations in the environment. The method including performing a beam training with a target device located in an environment to measure beam signal values and environmental responses for different beams transmitted over the different beam angles using control circuitry connected with the antennas. The control circuitry is configured for selecting, in response to the beam training, at least one dominant angle for a beamforming communication with the target device. Accessing a memory connected to the antennas, the memory having stored fingerprinting data. The stored fingerprinting data include values indicative of link attributes associated with beam signal measurements with states of devices and states of environments. The states of the devices include types of user behavior associated with each device, locations and poses of each device in each environment. Wherein the states of the environments include locations of physical objects and types of behavior of ambient users in each environment. Estimating from the mapping stored fingerprinting data in the memory, a state of the target device, a state of the environment, or a combination of both states corresponding to the environmental responses for different beams estimated during the beam training. Transmitting the estimated states of the target device and environment using the antennas via a beamforming transmission over the at least one dominant angle to communicate the state of the target device, the state of the environment, or both states. Wherein the following aspects either each aspect can modify the above embodiment to create a modified embodiment, or two or more aspects or any combination of multiple aspects can create one or more modified embodiments of the above embodiment.

An aspect can include the link attributes includes one or a combination of, beam SNR measurements, beam received signal strength indicator measurements, beam CSI measurements, beam patterns or beam sequencing, and wherein each device is associated with a user, such that the user is one of a robot, a human, a computer, a computer like device or an electronic device adaptable to a human.

Another aspect can include the antennas are arranged in a phased antenna array, and configured to transmit and receive millimeter wave signals with the devices at different locations in the environment.

An aspect may include the following aspects either each aspect can modify the above embodiment to create a modified embodiment, or two or more aspects or any combination of multiple aspects can create one or more modified embodiments of the above embodiment.

The following aspects below can be incorporated into embodiments of the present disclosure.

At least one benefit of the aspect can be that the control circuitry can be configured to mechanically adjust a position of at least one antenna in the phased array to direct the millimeter wave signals towards a location of the target device by controlling the mechanical positioner. Also, the control circuitry is configured to steer the millimeter wave signals towards the location of the target device by controlling the beam steering circuitry, wherein the control circuitry is configured to control the beam steering circuitry to steer the millimeter wave signals towards the location of the target device after the mechanical positioner mechanically adjusts the position of the at least one antenna in the phased antenna array.

Another aspect can be that the beam steering circuitry can include a plurality of phase controller circuits each of which is coupled to a corresponding antenna in the phased antenna array, and the control circuitry is configured to control the beam steering circuitry to steer the millimeter wave signals by adjusting phases provided by the plurality of phase controller circuits.

Another aspect can be that the control circuitry is configured to control the mechanical positioner to mechanically adjust the position of the at least one antenna in the phased array concurrently with steering the millimeter wave signals using the beam steering circuitry Another aspect can be that the target device is a wireless communication device, and is one of the devices of the devices in the environment. It is possible that the devices include a combination of one of at least one wireless communication device and at least one COTS device.

An aspect can be that the control circuitry can be a control module that sends a message to an antenna control module to initiate a beam refinement action that initiates a beam refinement phase that iteratively determines antenna-array weight vectors for a directional transmit beam pattern for the phased antenna array of the COTS AP using feedback information from a user, and sends the feedback information to the user using the directional transmit beam pattern for the phased antenna array of the COTS AP determined from feedback information from the user until a determined SNR value for a reliable data communication is reached. Also, an aspect can be that the antenna control module is configured to send receiver training signals to the user for use in forming a directional receive beam pattern for a phased antenna array of the user. It is possible that the antenna control module can be configured to send transmitter training signals to the user for use in forming a directional transmit beam pattern for the phased antenna array. Contemplated is that the antenna control module can be configured to receive receiver training signals from the user to form a directional receive beam pattern for the phased antenna array, such that the antenna control module is to receive feedback information from the user using the directional receive beam pattern for the phased antenna array. Further, the antenna control module can be configured to receive transmitter training signals from the user to form a directional transmit beam pattern for a phased antenna array of the user. It is also possible the antenna control module can be configured to continue beam forming operations using multiple iterations until a determined number of iterations is reached.

An aspect can that the fingerprinting dataset can include identification information for each device associated with a user that includes one or a combination of: a mobile equipment identifier associated with the user, a mobile device number associated with the user, an international mobile equipment identity associated with the user, an electronic serial number associated with the user.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Processor, by non-limiting example, as stated in claim 1 can be computer hardware, i.e. a logic circuitry that responds to and processes the basic instructions that drive a computer to implement the algorithm described in present disclosure.

Phased Array: A phased array is two or more antennas used together to provide some desired characteristic or feature not available with a single antenna. An array is usually a collection of multiple antennas arranged in a matrix of rows and columns or some other pattern. A review of a radiation pattern of a basic dipole includes a figure eight (8) pattern that causes most power to be radiated broadside from an antenna element and also some in other directions, except in those directions at the ends of the antenna elements. However, by using multiple antennas in an array, i.e. a phased array, the radiation pattern can be shaped into a narrower beam as shown in the figure below. This pattern or lobe is made up of multiple signals from multiple antennas in the array, i.e. phased array. The signals are focused, making them stronger and allowing the beam to be pointed in a desired direction.

For example, some benefits of using the phased array can be to achieve some needed features. Some of these key features may be:
  Directivity—Directivity can implies that the antenna is more effective in one direction or another. Directivity means that the signal is narrowly focused in one direction. This focusing of the signal is what creates the antenna gain. As the figure above showed the broad radiation pattern of a standard dipole and the radiation pattern (or sector, lobe) of a phased array.
  Gain—Gain is like amplification. Some types of antennas boost the signal level or effective radiated power (ERP) as if greater signal power is used. Gain applies to both transmitting and receiving.
  Interference Minimization—Pointing the antenna in a particular direction means that it's less effective in the other directions. This feature helps eliminate or reduce interference for signals coining in from other directions. Nulls can be created to take out undesirable signals.
  Steerable—Phased arrays can be adjusted to reposition a lobe on-the-fly. The direction of the signal can be changed electronically to optimize the gain. This allows them to scan horizontally and/or vertically.

Phased arrays implement what we call beamforming. This is done by taking the radiation patterns of each of the antennas in the array and adding them together in such a way that they concentrate the energy into a narrow beam or lobe. The individual antenna signals are said to be interfering with one another either constructively or destructively. Some signals combine to form a stronger composite signal, while others partially cancel one another out.

Devices 7D, 8D of FIG. 1C, can in communication with electronic devices that can be a separate and distinct device from devices 7D, 8D, that may be conjure to, or adapted, to conform and/or be associated with the devices 7D, 8D, such that each device 7D, 8D can have the same or different components. Devices 7D, 8D may also include types of wireless communications circuitry that is separate from the other device (7D or 8D).

Figure 10:
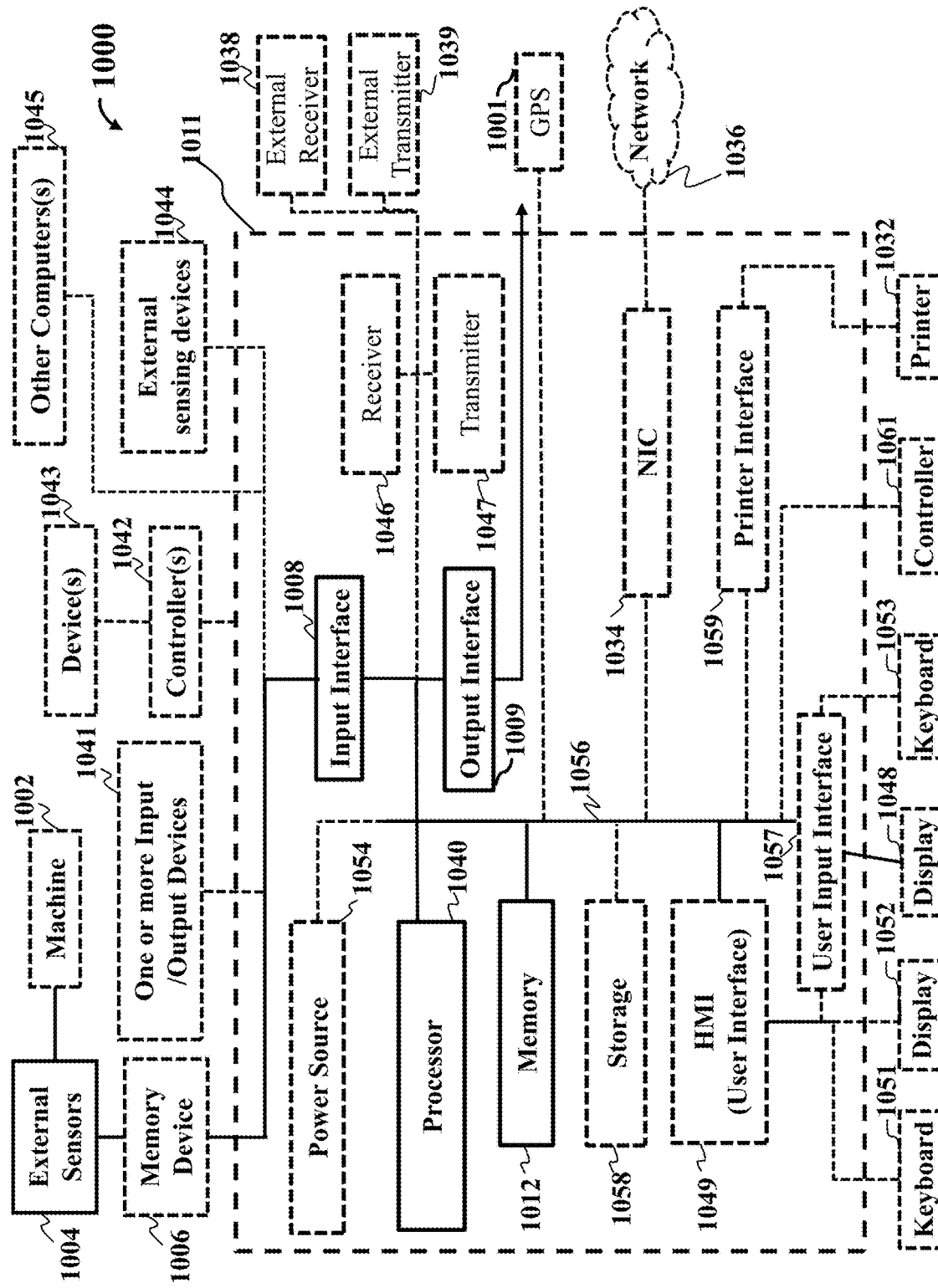
FIG. 10 is a block diagram of illustrating the method of FIG. 1A, that can be implemented using an alternate computer, according to some embodiments of the present disclosure.

FIG. 10 is a block diagram of illustrating the method of FIGS. 1A and 1B, that can be implemented using an alternate computer, according to embodiments of the present disclosure. The components 1000 can include a computer 1011 having a processor 1040, computer readable memory 1012, storage 1058 and user interface 1049 with display 1052 and keyboard 1051, which are connected through bus 1056. For example, the user interface 1064 in communication with the processor 1040 and the computer readable memory 1012 acquires and stores the data in the computer readable memory 1012 upon receiving an input from a surface, keyboard 1053, of the user interface 1057 by a user.

The computer 1011 can include a power source 1054; depending upon the application the power source 1054 may be optionally located outside of the computer 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein data or other data, among other things, can be rendered on a third party display device, third party imaging device, and/or third party printing device outside of the computer 1011. The computer/processor 1011 can include a GPS 1001 connected to bus 1056.

Still referring to FIG. 10, the data or other data, among other things, can be transmitted over a communication channel of the network 1036, and/or stored within the storage system 1058 for storage and/or further processing. Further, the time series data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. The computer 1011 may be connected via an input interface 1008 to external sensing devices 1044 and external input/output devices 1041. The input interface 1008 can be connected to one or more input/output devices 1041, external memory 1006, external sensors 1004, which may be connected to a machine like device 1002. A controller(s) 1042 can be connected to device(s) 1043. Further, other computer(s) 1045 can be connected to the bus 1056). For example, the external sensing devices 1044 may include sensors gathering data before-during-after of the collected time-series data of the machine. The computer 1011 may be connected to other external computers 1042. An output interface 1009 may be used to output the processed data from the processor 1040. It is noted that a user interface 1049 in communication with the processor 1040 and the non-transitory computer readable storage medium 1012, acquires and stores the region data in the non-transitory computer readable storage medium 1012 upon receiving an input from a surface 1052 of the user interface 1049 by a user. Further, a controller 1061 can be connected to the bus 1056, to control devices associated with the embodiments of the systems and methods of the present disclosure.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A communication system using beamforming transmission in a millimeter wave spectrum in an environment, that includes a phased antenna array configured to perform beamforming to establish millimeter wave channel links with devices at different locations in the environment, comprising:
    a memory connected to the phased antenna array, having stored data, the stored data include values indicative of signal to noise ratio (SNR) measurements of a set of beams emitted at different beam angles by the phased antenna array and measured at a set of locations, that provide for a mapping between different combinations of SNR values of the set of beams and the set of locations, such that a location from the set of locations is for a period of time mapped to a unique combination of the SNR values of the set of beams, and further provides information associated with types of behavior of the device at the location for that period of time, poses of the device at the location for that period of time, locations of physical objects in the environment for that period of time, and types of behavior of ambient users in the environment for that period of time;
    control circuitry communicatively connected with the phased antenna array and the memory, configured to:
        perform a beam training with a target device located in the environment to estimate SNR values for different beams transmitted over the different beam angles;
        select, in response to the beam training, at least one dominant angle for a beamforming communication with the target device;
        estimate from the mapping stored in the memory, a location of the target device corresponding to the SNR values for different beams estimated during the beam training; and
        transmit the estimated location of the target device using the phased antenna array via a beamforming transmission over the at least one dominant angle.

2. The communication system of claim 1, wherein the phased antenna array includes antenna beam sectors, such that the phased antenna array iteratively sweeps the environment, sequentially, to establish at least one millimeter wave link with the devices and the target device in the environment.

3. The communication system of claim 1, wherein stored data include values indicative of link attributes including one of beam received signal strength indicator (RSSI) measurements, beam channel state information (CSI) measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams.

4. The communication system of claim 3, wherein the link attributes further includes one or a combination of RSSI measurements or CSI measurements.

5. The communication system of claim 1, wherein the control circuitry is configured to control a mechanical positioner to mechanically adjust an orientation of the phased antenna array and/or control a beam steering circuitry to steer the millimeter wave signals towards the location of the target device.

6. The communication system of claim 1, wherein each device of the devices includes a phased antenna array having antenna beam sectors that sweep the environment, such that some devices of the devices are commercial off-the-shelf (COTS) devices.

7. The communication system of claim 1, wherein the target device is associated with an electronic device capable of establishing a link with the phased array of antennas, such that the target device is further associated with one of a robot, a human, a computer, a computer like device or an electronic device adaptable to a human.

8. A electronic system using beamforming transmission in a millimeter wave spectrum is configured to communicate with devices and a target device in an environment, that includes antennas configured to transmit and receive millimeter wave signals, comprising:
    a memory connected to the antennas, having stored data, the stored data include values indicative of signal to noise ratio (SNR) measurements of a set of beams emitted at different beam angles by the antennas and measured at a set of locations, that provide for a mapping between different combinations of SNR values of the set of beams and the set of locations, such that a location from the set of locations is for a period of time mapped to a unique combination of the SNR values of the set of beams, and further provides information associated with types of behavior of the device at the location for that period of time, poses of the device at the location for that period of time, locations of physical objects in the environment for that period of time, and types of behavior of ambient users in the environment for that period of time;
    control circuitry connected with the antennas and the memory, is configured to:
        perform a beam training with the target device located in the environment to estimate SNR values for different beams transmitted over the different beam angles;
        select, in response to the beam training, at least one dominant angle for a beamforming communication with the target device;
        estimate from the mapping stored in the memory, a location of the target device corresponding to the SNR values for different beams estimated during the beam training; and
        transmit the estimated location of the target device using the antennas via a beamforming transmission over the at least one dominant angle.

9. The electronic system of claim 8, wherein the antennas are arranged in a phased antenna array, and configured to transmit and receive millimeter wave signals with the devices at different locations in the environment.

10. The electronic system of claim 9, further comprising a mechanical positioner coupled to the phased antenna array, the control circuitry configured to mechanically adjust a position of at least one antenna in the phased antenna array to direct the millimeter wave signals towards a location of the target device by controlling the mechanical positioner.

11. The electronic system of claim 10, further comprising beam steering circuitry coupled to the phased antenna array, the control circuitry configured to steer the millimeter wave signals towards the location of the target device by controlling the beam steering circuitry, and steer the millimeter wave signals towards the location of the target device after the mechanical positioner mechanically adjusts the position of the at least one antenna in the phased antenna array.

12. A method using a communication system having beamforming transmission in a millimeter wave spectrum in an environment, that includes a phased antenna array configured to perform beamforming to establish millimeter wave channel links with devices at different locations in the environment, comprising:
performing a beam training with a target device located in an environment to estimate signal to noise ratio (SNR) measurement values for different beams transmitted over the different beam angles using control circuitry connected with the antennas, the control circuitry is configured for:
selecting, in response to the beam training, at least one dominant angle for a beamforming communication with the target device;
accessing a memory connected to the phased antenna array, the memory having stored data that include values indicative of SNR measurements of a set of beams emitted at different beam angles by the phased antenna array and measured at a set of locations in the environment, wherein the stored values provide a mapping between different combinations of SNR values of the set of beams and the set of locations, such that a location from the set of locations is for a period of time mapped to a unique combination of the SNR values of the set of beams, and further provides information associated with types of behavior of the device at the location for that period of time, poses of the device at the location for that period of time, locations of physical objects in the environment for that period of time, and types of behavior of ambient users in the environment for that period of time;
estimating from the mapping stored in the memory, a location of the target device corresponding to the SNR values for different beams estimated during the beam training; and
transmitting the estimated location of the target device using the phased antenna array via a beamforming transmission over the at least one dominant angle.

13. The method of claim 12, wherein the target device is associated with an electronic device capable of establishing a link with the phased array of antennas, such that the target device is further associated with one of a robot, a human, a computer, a computer like device or an electronic device adaptable to a human.

14. A communication system using beamforming transmission in a millimeter wave spectrum in an environment, that includes a phased antenna array configured to perform beamforming to establish millimeter wave channel links with devices at different locations in the environment, comprising:
a memory connected to the phased antenna array, having stored data, the stored data include values indicative of signal to noise ratio (SNR) measurements of a set of beams emitted at different beam angles by the phased antenna array and measured at a set of locations, that provide for a mapping between different combinations of SNR values of the set of beams and the set of locations, such that a location from the set of locations is mapped to a unique combination of the SNR values of the set of beams, and
wherein the stored data includes values indicative of link attributes including one of, beam received signal strength indicator (RSSI) measurements, beam channel state information (CSI) measurements, beam patterns or beam sequencing, each link attribute includes measurements of a set of beams emitted at different beam angles by the phased array of antennas and measured at a set of locations in the environment, such that the stored values provide a mapping between different combinations of at least one link attribute values of the set of beams and the set of locations, and that a location from the set of locations is mapped to a unique combination of the at least one link attribute values of the set of beams;
control circuitry communicatively connected with the phased antenna array and the memory, configured to:
perform a beam training with a target device located in the environment to estimate SNR values for different beams transmitted over the different beam angles;
select, in response to the beam training, at least one dominant angle for a beamforming communication with the target device;
estimate from the mapping stored in the memory, a location of the target device corresponding to the SNR values for different beams estimated during the beam training; and
transmit the estimated location of the target device using the phased antenna array via a beamforming transmission over the at least one dominant angle.

15. A communication system using beamforming transmission in a millimeter wave spectrum in an environment, that includes a phased antenna array configured to perform beamforming to establish millimeter wave channel links with devices at different locations in the environment, comprising:
a memory connected to the phased antenna array, having stored data, the stored data include values indicative of signal to noise ratio (SNR) measurements of a set of beams emitted at different beam angles by the phased antenna array and measured at a set of locations, that provide for a mapping between different combinations of SNR values of the set of beams and the set of locations, such that a location from the set of locations is mapped to a unique combination of the SNR values of the set of beams,
wherein the stored data includes values indicative of link attributes including one of, beam received signal strength indicator (RSSI) measurements, beam channel state information (CSI) measurements, beam patterns or beam sequencing, each link attribute includes measurements of a set of beams emitted at different beam angles by the phased array of antennas and measured at a set of locations in the environment, such that the stored values provide a mapping between different combinations of at least one link attribute values of the set of beams and the set of locations, and that a location from the set of locations is mapped to a unique combination of the at least one link attribute values of the set of beams, and wherein the link attributes further include one or a combination of RSSI measurements or CSI measurements;

control circuitry communicatively connected with the phased antenna array and the memory, configured to:

perform a beam training with a target device located in the environment to estimate SNR values for different beams transmitted over the different beam angles;

select, in response to the beam training, at least one dominant angle for a beamforming communication with the target device;

estimate from the mapping stored in the memory, a location of the target device corresponding to the SNR values for different beams estimated during the beam training; and transmit the estimated location of the target device using the phased antenna array via a beamforming transmission over the at least one dominant angle.

16. A method using a communication system having beamforming transmission in a millimeter wave spectrum in an environment, that includes a phased antenna array configured to perform beamforming to establish millimeter wave channel links with devices at different locations in the environment, comprising:

performing a beam training with a target device located in an environment to estimate signal to noise ratio (SNR) measurement values for different beams transmitted over the different beam angles using control circuitry connected with the antennas, the control circuitry is configured for:

selecting, in response to the beam training, at least one dominant angle for a beamforming communication with the target device;

accessing a memory connected to the phased antenna array, the memory having stored data that include values indicative of SNR measurements of a set of beams emitted at different beam angles by the phased antenna array and measured at a set of locations in the environment, wherein the stored values provide a mapping between different combinations of SNR values of the set of beams and the set of locations, such that a location from the set of locations is mapped to a unique combination of the SNR values of the set of beams, and wherein the stored data includes fingerprinting data, the fingerprinting data include each location from the set of locations mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time;

estimating from the mapping stored in the memory, a location of the target device corresponding to the SNR values for different beams estimated during the beam training; and transmitting the estimated location of the target device using the phased antenna array via a beamforming transmission over the at least one dominant angle.

* * * * *